US009639077B2

(12) United States Patent
Mizutani

(10) Patent No.: US 9,639,077 B2
(45) Date of Patent: May 2, 2017

(54) CONTROL DEVICE AND CONTROL METHOD TO CONTROL OPERATIONS AND TRANSMITTING DATA IN MULTI-PROCESSOR CONTROL SYSTEM

(71) Applicant: OMRON Corporation, Kyoto-shi, Kyoto (JP)

(72) Inventor: Seiji Mizutani, Moriyama (JP)

(73) Assignee: OMRON Corporation, Kyoto-shi (JP)

( * ) Notice: Subject to any disclaimer, the term of this patent is extended or adjusted under 35 U.S.C. 154(b) by 405 days.

(21) Appl. No.: 14/136,126

(22) Filed: Dec. 20, 2013

(65) Prior Publication Data
US 2014/0200684 A1 Jul. 17, 2014

(30) Foreign Application Priority Data
Jan. 15, 2013 (JP) .................................. 2013-004516

(51) Int. Cl.
| | | |
|---|---|---|
| G05B 19/18 | (2006.01) | |
| G05B 19/04 | (2006.01) | |
| G05B 19/418 | (2006.01) | |
| H04L 12/861 | (2013.01) | |
| G05B 19/05 | (2006.01) | |

(52) U.S. Cl.
CPC ............ *G05B 19/04* (2013.01); *G05B 19/05* (2013.01); *G05B 19/4185* (2013.01); *H04L 49/90* (2013.01); *G05B 2219/1208* (2013.01); *G05B 2219/15072* (2013.01); *Y02P 90/18* (2015.11)

(58) Field of Classification Search
CPC ................................ G05B 19/04; G05B 19/05
USPC ............................................ 700/3, 9, 19, 23
See application file for complete search history.

(56) References Cited

U.S. PATENT DOCUMENTS 4,124,889 A * 11/1978 Kaufman ................ G06F 11/10
700/3
5,170,340 A * 12/1992 Prokop .................. G03G 15/50
399/1
(Continued)

FOREIGN PATENT DOCUMENTS

| EP | 1137225 A1 | 9/2001 |
|---|---|---|
| EP | 2455832 A1 | 5/2012 |

(Continued)

OTHER PUBLICATIONS

Chaudhuri et al, "EON: Modeling and Analyzing Dynamic Access Control Systems with Logic Programs", ACM, pp. 381-390, 2008.*
(Continued)

*Primary Examiner* — Anil Khatri
(74) *Attorney, Agent, or Firm* — Mots Law, PLLC

(57) ABSTRACT

A control device efficiently performs priority-dependent data transmission through a communication line and a control method aimed at the priority-dependent data transmission. The control device includes a transmitter that transmits data as a frame to another unit through the communication line and a generator that generates the data to be transmitted to another unit. When the higher-priority data to be transmitted is generated in a receiver or a controller while the transmitter transmits a first frame, the transmitter transmits a second frame including the higher-priority data to be transmitted after transmitting a first frame up to a predetermined block.

14 Claims, 21 Drawing Sheets

(56) References Cited

U.S. PATENT DOCUMENTS

| | | | | |
|---|---|---|---|---|
| 5,317,501 | A | * | 5/1994 | Hilpert ............... G05B 19/4145 700/3 |
| 5,831,848 | A | * | 11/1998 | Rielly ................ G05B 19/0421 370/402 |
| 5,862,048 | A | * | 1/1999 | Knight ................. B60T 13/665 303/15 |
| 5,886,894 | A | * | 3/1999 | Rakoff ............... G05B 19/0421 700/3 |
| 5,980,078 | A | * | 11/1999 | Krivoshein ...... G05B 19/41865 700/1 |
| 6,359,970 | B1 | * | 3/2002 | Burgess .................. H04L 47/10 379/142.01 |
| 6,587,474 | B1 | * | 7/2003 | Griessbach ......... B60R 16/0315 370/446 |
| 6,597,956 | B1 | * | 7/2003 | Aziz ................... G06F 9/45504 700/101 |
| 6,823,219 | B2 | * | 11/2004 | Lee ........................ G05B 15/02 340/855.4 |
| 7,003,593 | B2 | * | 2/2006 | Huppenthal ........ G06F 15/7867 700/2 |
| 8,131,382 | B2 | * | 3/2012 | Asada ............. G01N 35/00871 700/3 |
| 8,346,378 | B2 | * | 1/2013 | Ono ....................... G05B 19/05 700/11 |
| 8,676,390 | B2 | * | 3/2014 | Berry, Jr. .......... G05B 19/4188 700/20 |
| 2001/0030974 | A1 | | 10/2001 | Pauwels |
| 2006/0230195 | A1 | | 10/2006 | Kootstra et al. |
| 2008/0056192 | A1 | | 3/2008 | Strong et al. |
| 2008/0071924 | A1 | | 3/2008 | Chilukoor |
| 2012/0179849 | A1 | | 7/2012 | Mizutani |

FOREIGN PATENT DOCUMENTS

| | | |
|---|---|---|
| JP | 2011-192068 A | 9/2011 |
| WO | 2006111788 A1 | 10/2006 |
| WO | 2008025620 A1 | 3/2008 |

OTHER PUBLICATIONS

Langari , "Hierarchical Approach to Fuzzy Logic Control", ACM, pp. 605-608, 1996.*

McLaughlin et al, "Sabot: Specification-based Payload Generation for Programmable Logic Controllers", ACM, pp. 439-449, 2012.*

Langari, "Hierarchical Approach to Fuzzy Logic Control", ACM, pp. 605-608, 1996.*

Liang et al, "Unifying Classical and Intuitionistic Logics for Computational Control", IEEE, pp. 283-292—2013.*

Lau et al, "Poster: Towards Highly Interactive Honeypots for Industrial Control Systems", ACM, pp. 1823-1825, 2016.*

Youichi Nasuno and Takahiro Okada, Stopping Unnecessary Packets and Prioritizing Important Packets, Nikkei Network, Aug. 2005, p. 168-173, vol. 64, Nikkei Business Publications, Inc., Japan.

* cited by examiner

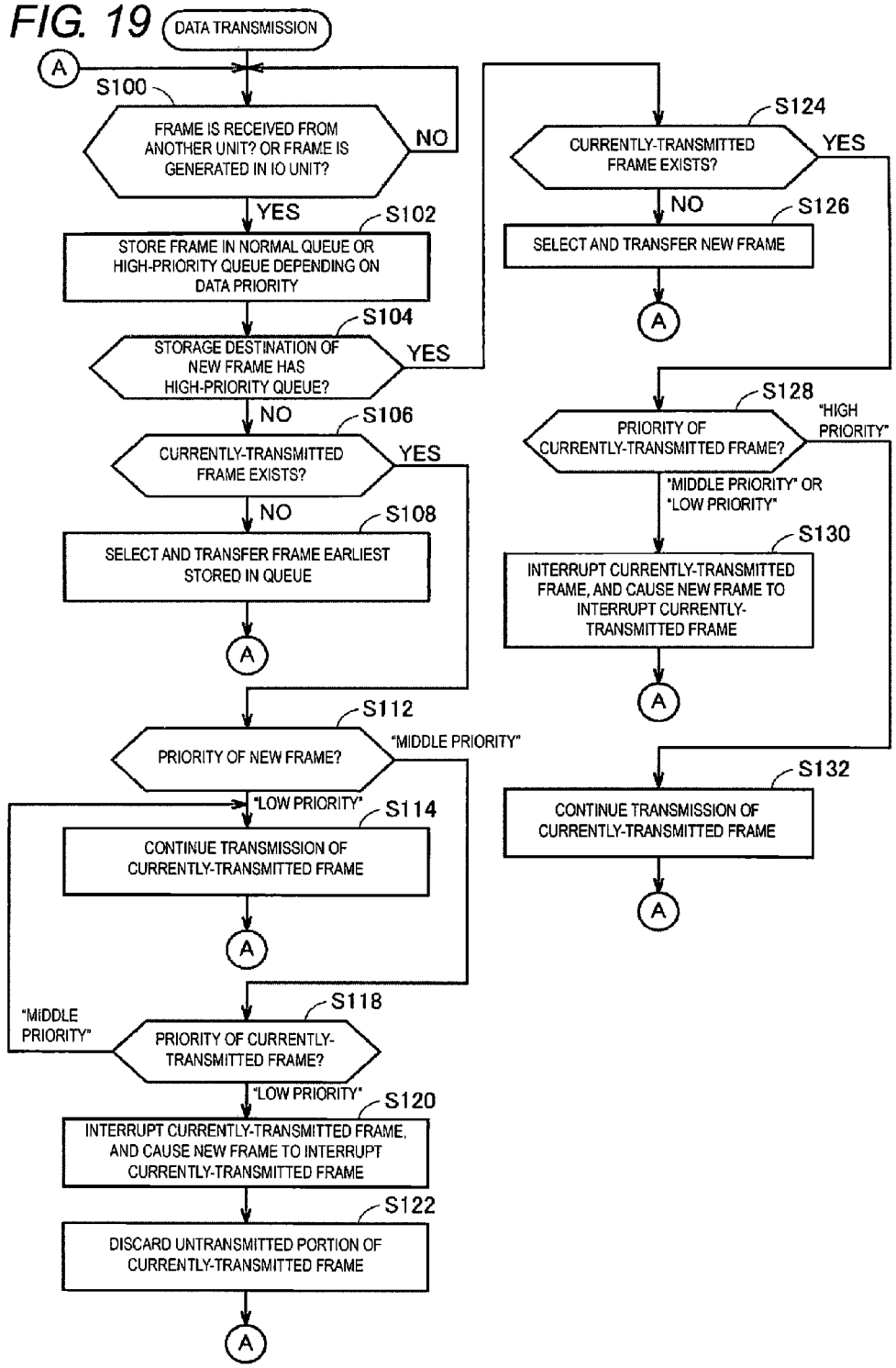

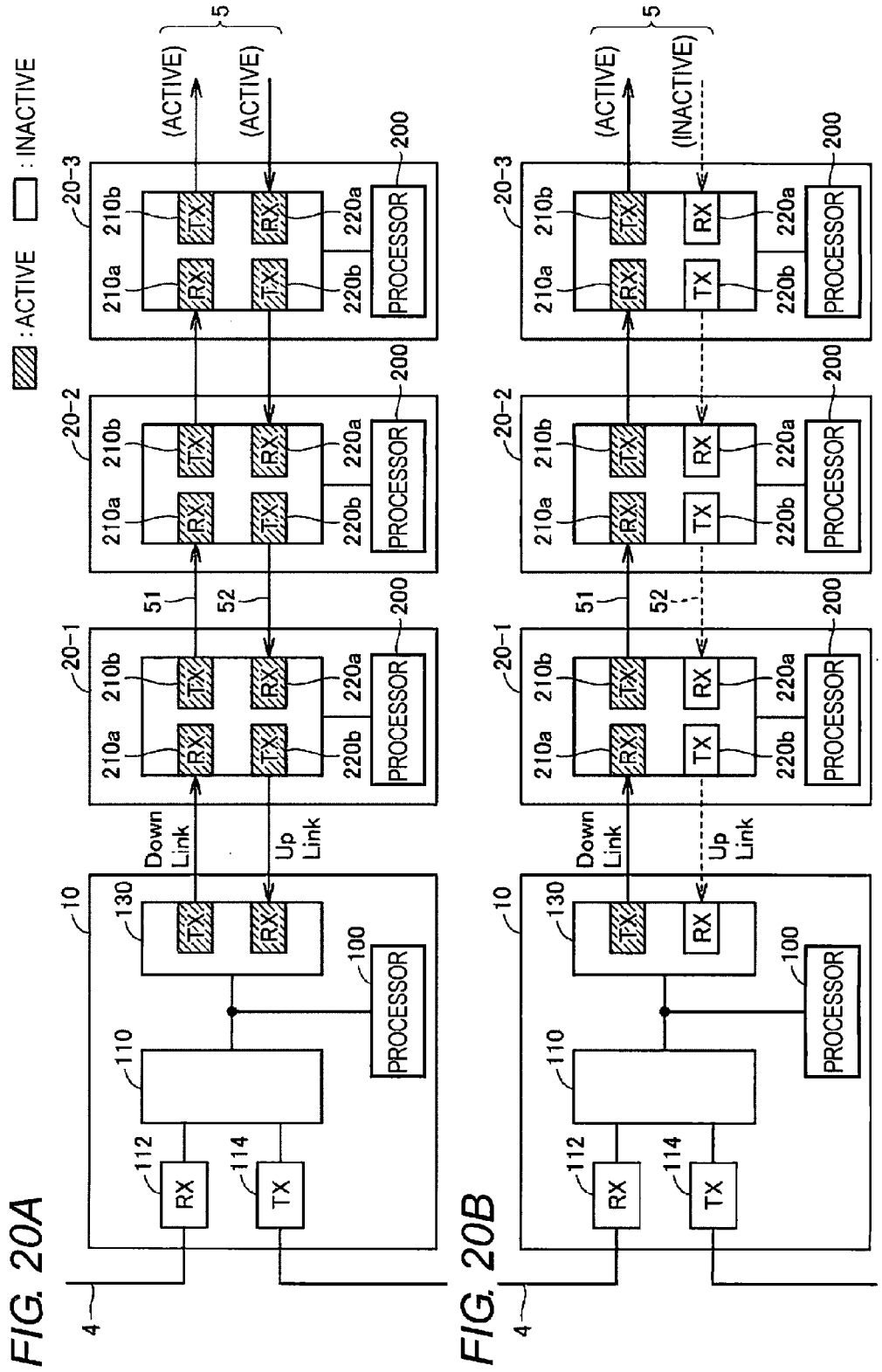

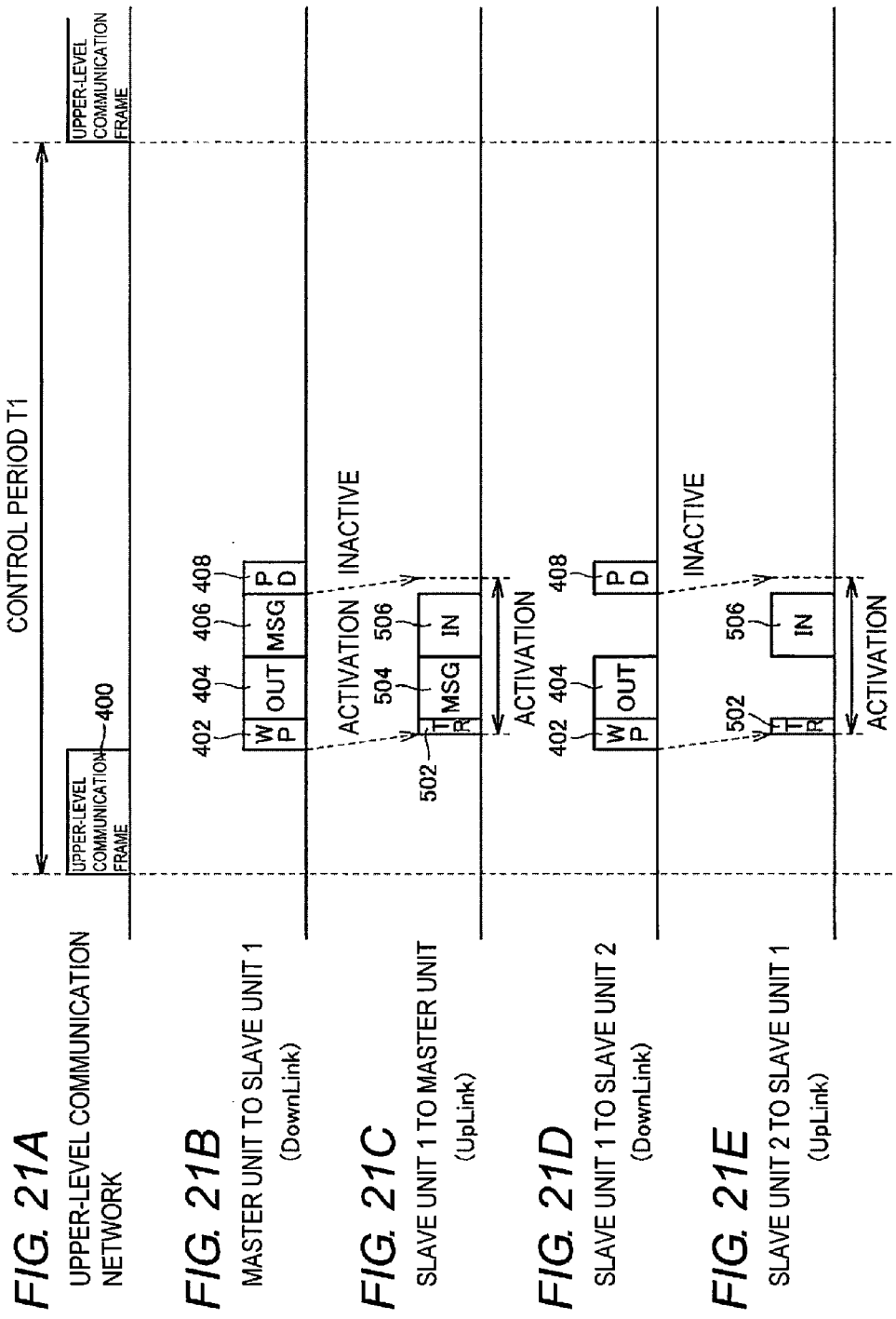

CONTROL DEVICE AND CONTROL METHOD TO CONTROL OPERATIONS AND TRANSMITTING DATA IN MULTI-PROCESSOR CONTROL SYSTEM

CROSS REFERENCE TO RELATED APPLICATIONS

This application claims priority based on 35 USC §119 from prior Japanese Patent Application No. P2013-004516 filed on Jan. 15, 2013, entitled "CONTROL DEVICE AND CONTROL METHOD", the entire contents of which are incorporated herein by reference.

BACKGROUND

1. Technical Field

The present invention relates to data transmission in a control system used to control operation of a machine or a facility.

2. Related Art

Typically, machines and facilities used in production sites are controlled by a control system including a Programmable Logic Controller (hereinafter also referred to as a "PLC"). The control system includes an IO (Input and Output) unit that plays a role to input a signal from an external switch or sensor and output a signal to an external relay or actuator. The IO unit is scheduled to be disposed in various places of the production site.

The IO unit is connected to a processing unit including a processor through a communication line. Sometimes the communication line is constructed as an internal bus. In the case that the internal bus is used, use of a relatively high clock frequency (transmission frequency) can enhance a transmission capability (such as a transmission rate and a transmission band).

For example, Japanese Unexamined Patent Publication No. 2011-192068 discloses a configuration in which data communication is surely conducted at high speed between units constituting the PLC in consideration of an influence of a noise.

Even if the communication line having the high transmission capability is used, possibly a state in which subsequent data cannot be transmitted because preceding data exists, namely, a "transmission waiting" state is generated when many pieces of data are transmitted. On the other hand, a priority corresponding to a content can exist among the pieces of data that are transmitted and received through the communication line.

SUMMARY

An object of the present invention is to provide a control device that can efficiently perform priority-dependent data transmission through the communication line and a control method aimed at the priority-dependent data transmission.

In accordance with one aspect of the present invention, a control device constituting at least a part of a control system is provided. The control device includes a plurality of units connected to each other through a communication line. In the control device, each of the plurality of units includes: a controller; a receiver configured to receive data from another unit through the communication line, the data being transmitted as a frame that is constructed by one or a plurality of blocks and comprises information indicating a priority of the data comprised in the frame; a transmitter configured to transmit the data as the frame to another unit through the communication line; and a generator configured to generate the data to be transmitted to another unit. The transmitter transmits a second frame including the higher-priority data to be transmitted after transmitting a first frame up to a predetermined block, when the higher-priority data to be transmitted is generated in the receiver or the controller while the transmitter transmits the first frame.

Preferably the transmitter interrupts the transmission of an untransmitted portion of the first frame until the transmission of the second frame is completed.

Preferably the transmitter discards an untransmitted portion of the first frame. Preferably the transmitter transmits the second frame in advance of a third frame waiting to be transmitted, when the third frame exists at the generation of the data to be transmitted, and when the priority of the data included in the third frame is lower than the priority of the data to be transmitted.

Preferably the transmitter transmits the second frame after transmitting the third frame waiting to be transmitted, when the third frame exists at the generation of the data to be transmitted, and when the priority of the data included in the third frame is equal to the priority of the data to be transmitted.

Preferably each of the plurality of units includes: a plurality of buffers; and a determination section configured to determine a buffer in which at least one of the data included in the frame received by the receiver and the data generated by the generator is stored based on the information indicating the priority of the data.

Preferably the generator adds the information indicating the priority to the generated data according to a data type.

In accordance with another aspect of the present invention, a control method in a control system in which at least a part of the control system is constructed by a control device is provided. The control device includes a plurality of units connected to each other through a communication line. The control method includes: a step in which a first unit in the plurality of units receives data from another unit through the communication line, the data being transmitted as a frame. Each frame is constructed by one or a plurality of blocks and includes information indicating a priority of the data included in the frame. The control method further includes a step in which the first unit transmits the data as the frame to another unit through the communication line; a step in which the first unit generates the data to be transmitted to another unit; and a step in which the first unit transmits a second frame including the higher-priority data to be transmitted after transmitting a first frame up to a predetermined block, when the higher-priority data to be transmitted is generated while the first unit transmits the frame to another unit.

According to the control device and control method described above, the priority-dependent data transmission can more efficiently be performed through the communication line.

BRIEF DESCRIPTION OF THE DRAWINGS

FIG. 19 is a flowchart illustrating a processing procedure of the priority-dependent data transmission of the embodiment of the present invention;

FIGS. 20A and 20B are views illustrating a method for implementing low power consumption in the remote IO device using the priority-dependent data transmission of the embodiment of the present invention; and FIGS. 21A-21E are timing charts illustrating a communication procedure in the remote IO device using the priority-dependent data transmission of the embodiment of the present invention.

DETAILED DESCRIPTION

Figure 1:
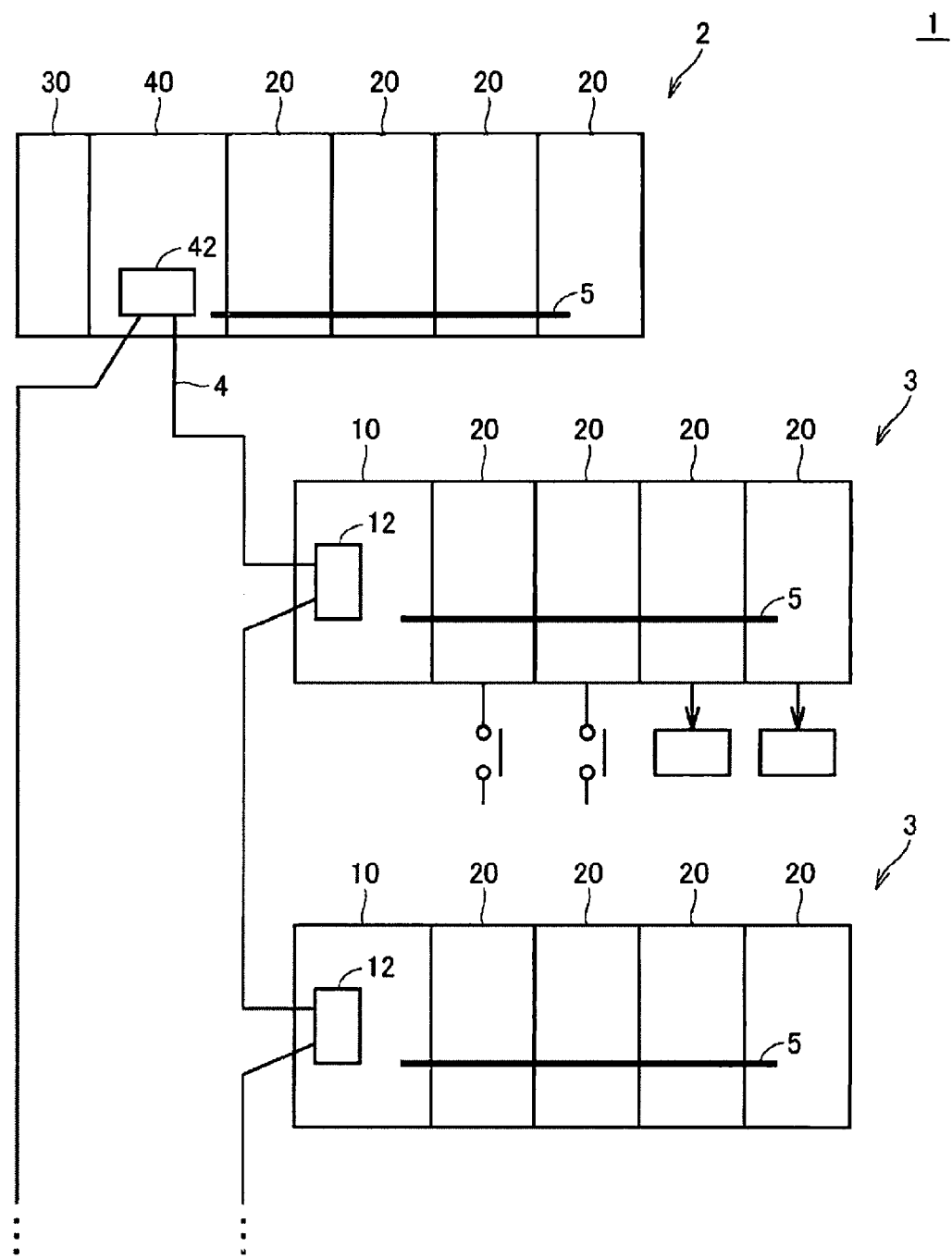
FIG. 1 is a schematic diagram illustrating an entire configuration of a PLC system according to an embodiment of the present invention.

Hereinafter, an embodiment of the present invention will be described below with reference to the drawings. The identical or equivalent component in the drawings is designated by the identical numeral, and the overlapping description is not repeated.

In the embodiment, a system in which a PLC plays a leading role is illustrated as an example of a control system. However, the control system is not limited to the PLC, but configurations in which various industrial computers play the leading role may also be adopted as the control system. When a new processor (arithmetic unit) is developed with the progress of technology, the processor can also be used as the control system.

A. Entire Configuration of PLC System

An entire configuration of a PLC system of the embodiment will be described. FIG. 1 is a schematic diagram illustrating an entire configuration of a PLC system 1 of the embodiment of the present invention.

Referring to FIG. 1, the PLC system 1 includes a main processing device 2 and at least one remote IO device 3. The main processing device 2 is connected to the remote IO devices 3 through a field bus 4. Each of the remote IO devices 3 includes a communication module 12 connected to the field bus 4.

The main processing device 2 is a control device constituting at least a part of the PLC system 1. The main processing device 2 executes a control program, and calculates a signal output to an external relay or actuator in response to a signal input from an external switch or sensor.

More specifically, the main processing device 2 includes a power supply unit 30, a CPU unit 40, and IO units 20. The CPU unit 40 and the IO units 20 are connected to each other through an internal bus 5 so as to be able to transmit data.

The power supply unit 30 supplies a power having a proper voltage to the CPU unit 40 and the IO units 20. The CPU unit 40 is an arithmetic main body including a processor that executes the control program and a main memory. The IO unit 20 plays a role to input the signal from the external switch or sensor and output the signal to the external relay or actuator.

The CPU unit 40 includes a communication module 42 that exchange the data with the remote IO device 3 through the field bus 4. Desirably a communication method in which communication can be conducted in a predetermined control period (communication can be conducted in real time) is adopted in the field bus 4. In other words, desirably punctuality is ensured in the field bus 4 of the embodiment.

Various industrial Ethernets (registered trademark) can be cited as a typical example of the field bus 4. Examples of industrial Ethernets (registered trademark) include EtherCAT (registered trademark), Profinet IRT, MECHATROLINK (registered trademark)-III, Powerlink, SERCOS (registered trademark)-III, CIP Motion. A field network except industrial Ethernet (registered trademark) may be used. For example, DeviceNet and CompoNet/IP (registered trademark) may be used.

The remote IO device 3 is the control device constituting at least a part of the PLC system 1. The remote IO device 3 receives the signal input from the external switch or sensor, transmits the received signal to the main processing device 2 through the field bus 4, and outputs the signal received from the main processing device 2 through the field bus 4 to the external relay or actuator.

More specifically, the remote IO device 3 includes a master unit 10 and at least one IO unit 20. The master unit 10 and the IO units 20 are connected to each other through the internal bus 5 so as to be able to transmit the data.

The master unit 10 mainly controls operation (such as IO data update timing of the IO unit 20), and controls data transmission to the main processing device 2. The master unit 10 is described in detail later.

The IO unit 20 has a function of performing general input/output processing in addition to the function of transmitting the data to the master unit 10 (or CPU unit 40) through the internal bus 5. Typically, the IO unit 20 inputs and outputs the binary data such as on/off. For example, the IO unit 20 collects information indicating some sort of target object is detected (on state) or not detected (off state) from a detection sensor. The IO unit 20 issues an activation command (on) and an inactivation command (off) to output destinations such as the relay and the actuator.

In the above description, by way of example, each of the IO unit 20 is configured to perform the input/output processing. Alternatively, the IO unit 20 may have a specialized configuration (input unit) for the input processing or a specialized configuration (output unit) for the output processing.

B. More Efficient Priority-Dependent Data Transmission

In the internal bus 5 of the PLC system 1 of the embodiment, the devices are connected to one another in a daisy chain manner. More specifically, the internal bus 5 has a master/slave configuration, and the internal bus 5 is constructed by a communication line in which a downlink (hereinafter also referred to as a "DL") and an uplink (hereinafter also referred to as an "UL") make a pair. The data is transmitted from a master side to a slave side through the downlink, and the data is transmitted from the slave side to the master side through the uplink. In the communication line, one channel (line) or many channels may be prepared.

In the internal bus 5 of the PLC system 1, basically transmission/reception control of each device is performed in units of frames. As described later, each frame is constructed by at least one frame boundary synchronous code and at least one block. Each block is a unit of transmitted and received data, and the block is generated according to a predetermined format. That is, because an amount of data included in each block is previously fixed, the transmitted and received data is transmitted while divided into the number of blocks corresponding to the data amount. Typically, a data size of the block is set to the amount of data that can be processed by each device at once (parallel processing). Therefore, in the case that interruption/resumption of the transmission/reception processing related to one frame is performed, desirably the interruption/resumption is performed in units of blocks included in the frame.

In the communication line of the embodiment, a transmission procedure is changed depending on the priority of the data included in each frame. When the state in which the frame including the higher-priority data should be transmitted is generated, after the IO unit 20 transmits the currently-transmitted frame (including the lower-priority data) up to a predetermined separation (a later-described boundary of the "block"), the IO unit 20 interrupts the transmission to start the transmission of the frame including the higher-priority data.

Thus, when the higher-priority data to be transmitted is generated in the receiver or controller of the IO unit 20 while the transmitter of the IO unit 20 transmits the preceding frame, the transmitter transmits a second frame including the higher-priority data to be transmitted after transmitting a currently-transmitted first frame up to the predetermined block.

The data transmission processing of the embodiment in various situations will be described below after the description of a hardware configuration.

C. Hardware Configuration of Remote IO Device 3

The hardware configuration of the remote IO device 3 that is of the control device constituting a part of the PLC system 1 of the embodiment will be described below.

Figure 2:
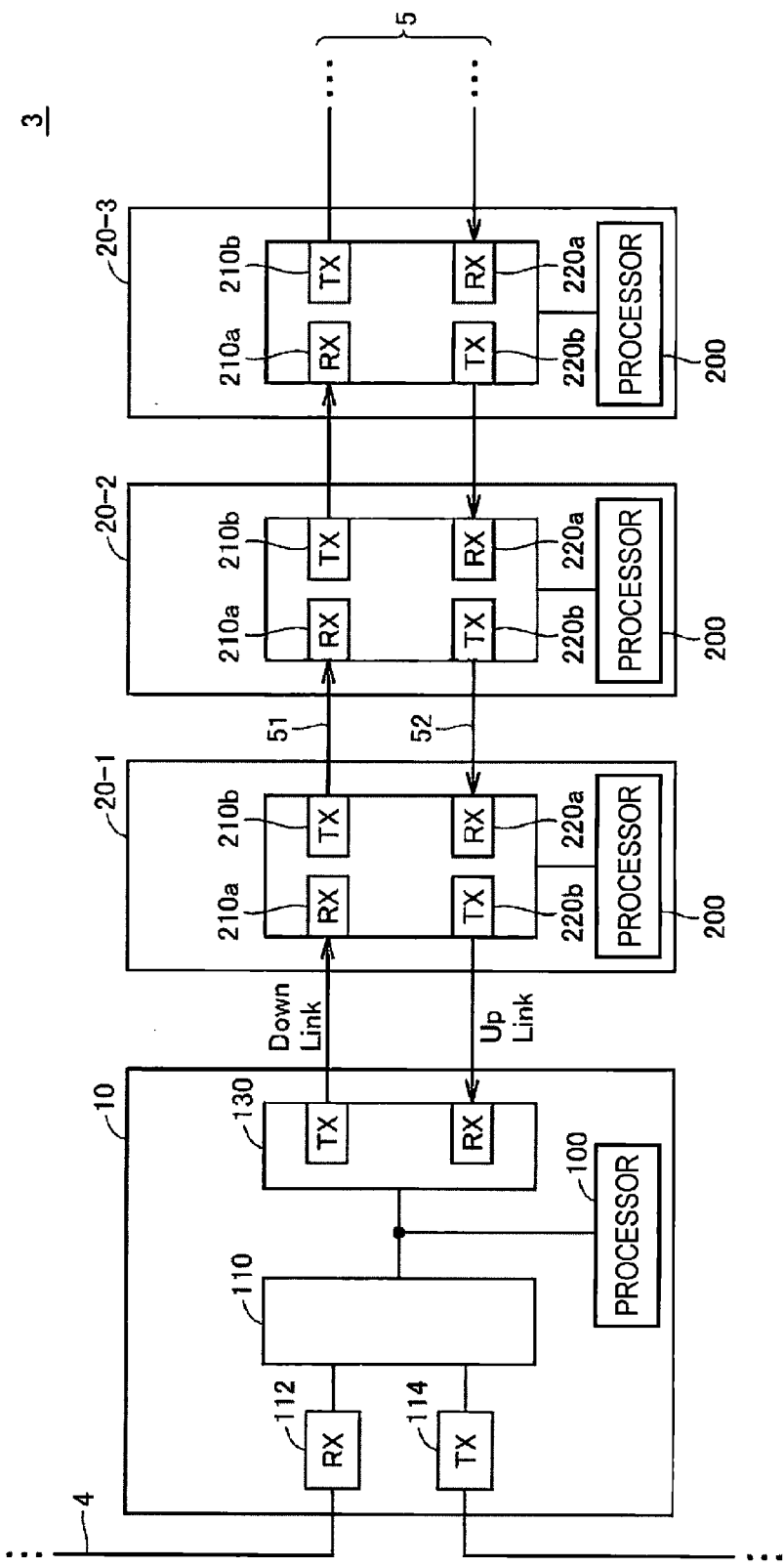
FIG. 2 is a schematic diagram illustrating a connection configuration of a remote IO device of the embodiment of the present invention.
Figure 3:
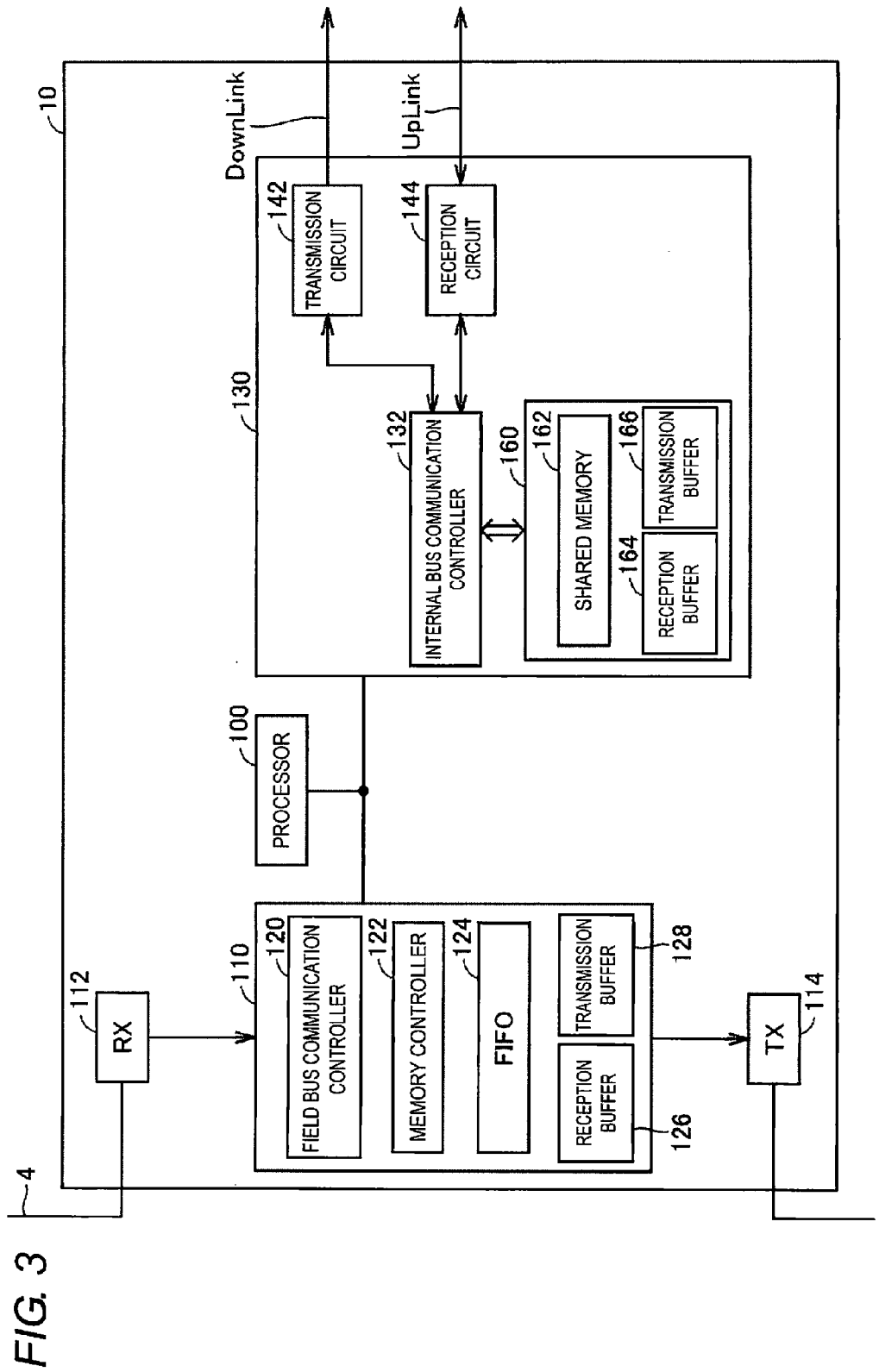
FIG. 3 is a schematic diagram illustrating a hardware configuration of a master unit constituting the remote IO device of the embodiment of the present invention.
Figure 4:
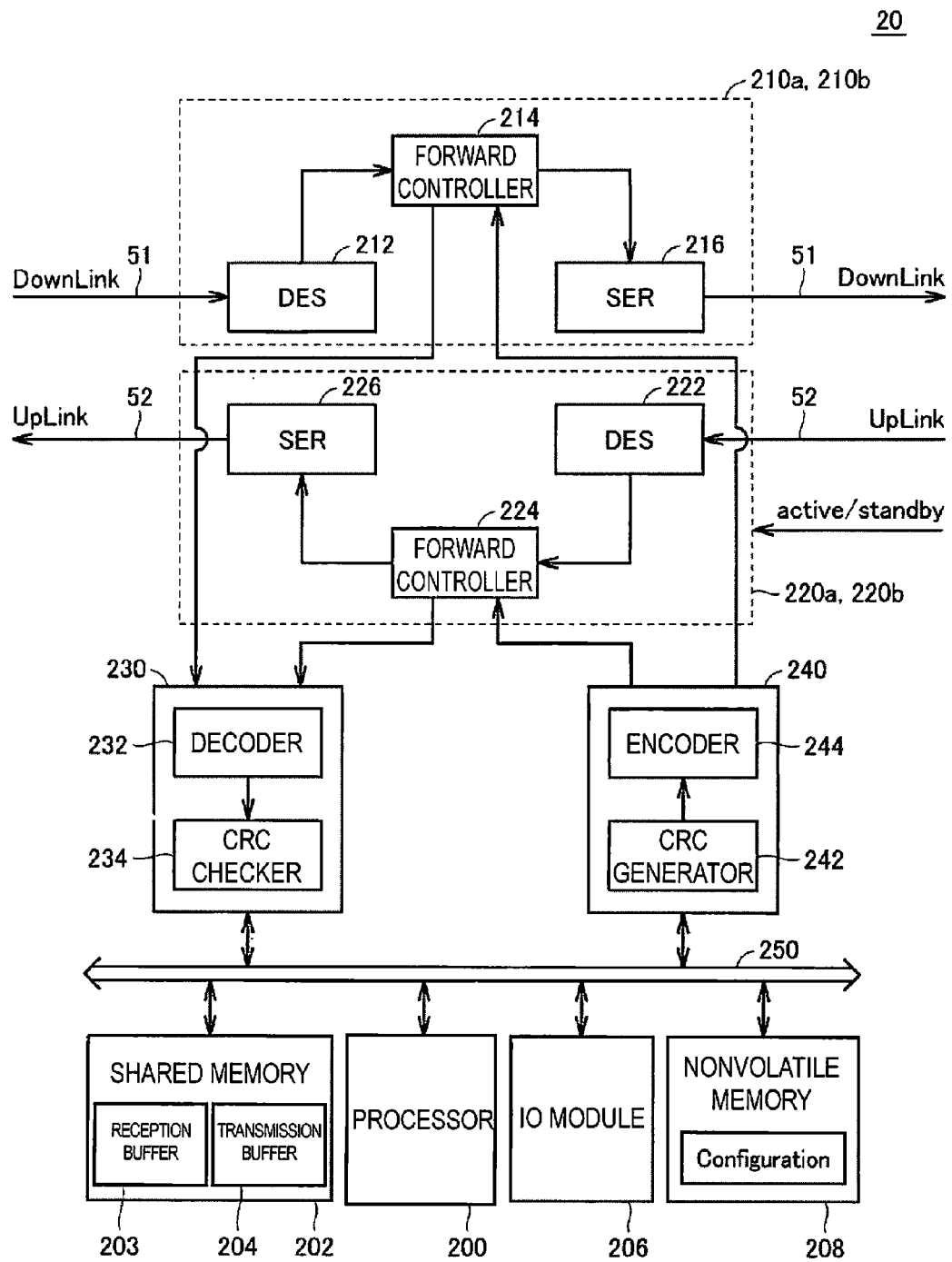
FIG. 4 is a schematic diagram illustrating the hardware configuration of an IO unit of the remote IO device of the embodiment of the present invention.

FIG. 2 is a schematic diagram illustrating a connection configuration of the remote IO device 3 of the embodiment of the present invention. FIG. 3 is a schematic diagram illustrating the hardware configuration of the master unit 10 constituting the remote IO device 3 of the embodiment of the present invention. FIG. 4 is a schematic diagram illustrating the hardware configuration of the IO unit 20 of the remote IO device 3 of the embodiment of the present invention.

C1: Connection Configuration

Referring to FIG. 2, in the remote IO device 3, the master unit 10 and IO units 20-1, 20-2, and 20-3 (hereinafter also collectively referred to as an the "IO unit 20") can transmit the data to one another through the internal bus 5 (downlink 51 and uplink 52) that is of the communication line. That is, the remote IO device 3 includes a plurality of units (master unit 10 and IO units 20) that are connected to each other through the communication line.

By way of example, in the downlink 51 and the uplink 52, serial communication is adopted, the target data is transmitted while arrayed in line in time series. More specifically, in the downlink 51, the data is unidirectionally transmitted from the master unit 10 acting as a master controller toward the IO unit 20 acting as a slave controller through the downlink 51. On the other hand, in the uplink 52, the data is unidirectionally transmitted from one of the IO units 20 toward the master unit 10 through the uplink 52.

In the embodiment, the data is transmitted as the frame including header information. Each frame is constructed by one or a plurality of blocks. The header information includes information indicating the priority of the data in the frame. The header information also includes information on a length of the frame. The detailed structure of the frame is described later.

When receiving the frame transmitted through the downlink 51 or the uplink 52, each IO unit 20 decodes the data from the frame to perform necessary processing. Each IO unit 20 regenerates the frame, and retransmits (forwards) the frame to the IO unit 20 in a next stage.

In order to perform the sequential transfer of the frame including the pieces of data, each IO unit 20 includes a receiver (hereinafter also referred to as an "RX") 210*a* and a transmitter (hereinafter also referred to as an "TX") 210*b* with respect to the downlink 51 and a receiver 220*a* and a transmitter 220*b* with respect to the uplink 52. The receivers 210*a* and 220*a* receive the data transmitted as the frame from another unit through the internal bus 5 that is of the communication line. The transmitters 210*b* and 220*b* transmit the data transmitted as the frame to another unit through the internal bus 5 that is of the communication line.

Each IO unit 20 includes a processor 200 that is of the controller, and the processor 200 controls the processing of the pieces of data.

The master unit 10 includes a processor 100, a field bus controller 110, a receiver 112, a transmitter 114, and an internal bus controller 130. The master unit 10 is connected to not only the internal bus 5 (downlink 51 and uplink 52) but also the field bus 4 that is of an upper-level communication network through the receiver 112 and the transmitter 114. The field bus controller 110 manages the data transmission through the field bus 4, and the internal bus controller 130 manages the data transmission through the internal bus 5.

C2: Configuration of Master Unit 10

Referring to FIG. 3, the master unit 10 of the remote IO device 3 includes a processor 100, a field bus controller 110, a receiver 112, a transmitter 114, and an internal bus controller 130.

The receiver 112 receives an upper-level communication frame transmitted from the main processing device 2 through the field bus 4, decodes the frame into the data, and outputs the data to the field bus controller 110. The transmitter 114 regenerates the upper-level communication frame from the data output from the field bus controller 110, and retransmits (forwards) the frame through the field bus 4.

In conjunction with the receiver 112 and the transmitter 114, the field bus controller 110 transmits and receives the data to and from another device (main processing device 2 and another remote IO device 3) through the field bus 4 in each control period. More specifically, the field bus controller 110 includes an upper-level communication controller 120, a memory controller 122, an FIFO (First In First Out) memory 124, a reception buffer 126, and a transmission buffer 128.

The upper-level communication controller 120 interprets a command transmitted from the main processing device 2 through the field bus 4, and performs processing necessary to conduct the communication through the field bus 4. The upper-level communication controller 120 also performs processing of copying the data from the upper-level communication frame sequentially stored in the FIFO memory 124 and processing of writing the data in the upper-level communication frame.

The memory controller 122 is a control circuit that implements a function such as DMA (Dynamic Memory Access), and the memory controller 122 controls write/read of the data in/from the FIFO memory 124, the reception buffer 126, and the transmission buffer 128.

The upper-level communication frame received through the field bus 4 is temporarily stored in the FIFO memory 124, and the FIFO memory 124 sequentially outputs the upper-level communication frame in the storage order. The reception buffer 126 extracts the data indicating a state value that should be output from an output section of the IO unit 20 connected to the own master unit 10 in the pieces of data included in the upper-level communication frame sequentially stored in the FIFO memory 124, and the extracted data is temporarily stored in the reception buffer 126. The data is process data indicating the state value detected by the input section of the IO unit 20 and should be written in a predetermined area of the upper-level communication frame sequentially stored in the FIFO memory 124, and is temporarily stored in the transmission buffer 128.

The processor 100 issues an instruction to the field bus controller 110 and the internal bus controller 130, and controls data transfer between the field bus controller 110 and the internal bus controller 130.

The internal bus controller 130 transmits and receives the frame (data) to and from the IO unit 20 through the internal bus 5 (downlink 51 and uplink 52).

More specifically, the internal bus controller 130 includes an internal bus communication controller 132, a transmission circuit 142, a reception circuit 144, and a storage 160.

The internal bus communication controller 132 initiatively manages (as the master) the data transmission through the internal bus 5.

In response to the instruction from the internal bus communication controller 132, the transmission circuit 142 generates and transmits the frame flowing on the downlink of the internal bus 5. The reception circuit 144 receives the frame flowing on the uplink of the internal bus 5, and outputs the frame to the internal bus communication controller 132.

The storage 160 corresponds to the buffer memory in which the frame (data) transmitted through the internal bus 5 is stored. More specifically, the storage 160 includes a shared memory 162, a reception memory 164, and a transmission memory 166. The data exchanged between the field bus controller 110 and the internal bus controller 130 is temporarily stored in the shared memory 162. The data transmitted from the IO unit 20 through the internal bus 5 is temporarily stored in the reception memory 164. The data included in the upper-level communication frame received by the field bus controller 110 is temporarily stored in the transmission memory 166.

C3: Configuration of IO Unit 20

Referring to FIG. 4, each IO unit 20 of the remote IO device 3 includes de-serializers (hereinafter also referred to as "DES sections") 212 and 222, serializers (hereinafter also referred to as "SER sections") 216 and 226, and forward controllers 214 and 224. Each IO unit 20 also includes a reception processing section 230, a transmission processing section 240, a processor 200, a shared memory 202, an IO module 206, and a nonvolatile memory 208, which are connected to one another through a bus 250.

The DES section 212, the forward controller 214, and the SER section 216 correspond to the receiver 210a and the transmitter 210b with respect to the downlink 51 in FIG. 2. That is, the DES section 212, the forward controller 214, and the SER section 216 perform the processing of transmitting and receiving the frame flowing on the downlink 51. Similarly, the DES section 222, the forward controller 224, and the SER section 226 correspond to the receiver 220a and the transmitter 220b with respect to the uplink 52 in FIG. 2. That is, the DES section 222, the forward controller 224, and the SER section 226 perform the processing of transmitting and receiving the frame flowing on the uplink 52.

The reception processing section 230 includes a decoder 232 and a CRC checker 234. The decoder 232 decodes the received frame into the data according to a predetermined algorithm. The CRC checker 234 performs an error check (for example, Cyclic Redundancy Check (CRC) code) based on a Frame Check Sequence (FCS) added to the end of the frame.

The transmission processing section 240 is connected to the forward controllers 214 and 224. In response to the instruction from the processor 200, the transmission processing section 240 generates the frame retransmitted (forwarded) to the IO unit 20 in the next stage, and performs timing control. In conjunction with the processor 200, the transmission processing section 240 generates the data that should be transmitted to the IO unit 20 in the next stage. That is, the transmission processing section 240 constitutes at least a part of the data generator. More specifically, the transmission processing section 240 includes a CRC generator 242 and an encoder 244. The CRC generator 242 calculates an error control code (CRC) with respect to the data from the processor 200, and adds the error control code to the frame including the data. The encoder 244 encodes the data from the CRC generator 242, and outputs the data to the corresponding forward controller 214 or 224.

The processor 200 is an arithmetic main body that initiatively controls the IO unit 20. More specifically, the processor 200 stores the frame received through the reception processing section 230 in the shared memory 202 by executing a previously-stored program, or the processor 200 reads the predetermined data from the shared memory 202, and outputs the data to the transmission processing section 240 to generate the frame.

The shared memory 202 includes a reception buffer 203 in which the frame received through the reception processing section 230 is temporarily stored and a transmission buffer 204 in which the frame transmitted through the transmission processing section 240 is temporarily stored. The shared memory 202 includes an area in which various pieces of data are stored.

The IO module 206 receives the signal input from the external switch or sensor, writes a value of the signal in the shared memory 202, and outputs the signal to the external relay or actuator according to the value written in the corresponding area of the shared memory 202. That is, the IO module 206 includes at least one of an input section that collects the state value (IN data) of the externally-input signal and an output section that outputs the signal of the designated state value (OUT data).

Various pieces of data are stored in the nonvolatile memory 208 in a nonvolatile manner. More specifically, the nonvolatile memory 208 retains a configuration describing a setting value of each IO unit 20.

C4: Others

Desirably each of the components of the master unit 10 and the IO unit 20, which constitute the remote IO device 3, is constructed by hardware such as an ASIC (Application Specific Integrated Circuit) and an FPGA (Field-Programmable Gate Array) from the viewpoint of processing speed enhancement. However, a part of or all the components may be mounted as software. For example, only the parts corresponding to the receivers 210a and 220a and the transmitters 210b and 220b in FIG. 2 may be mounted using the physical circuit such as the ASIC, and the processor may execute the program to implement other parts.

D. Hardware Configuration of Main Processing Device 2

The hardware configuration of the main processing device 2 that is of the control device constituting a part of the PLC system 1 of the embodiment will be described below.

Figure 5:
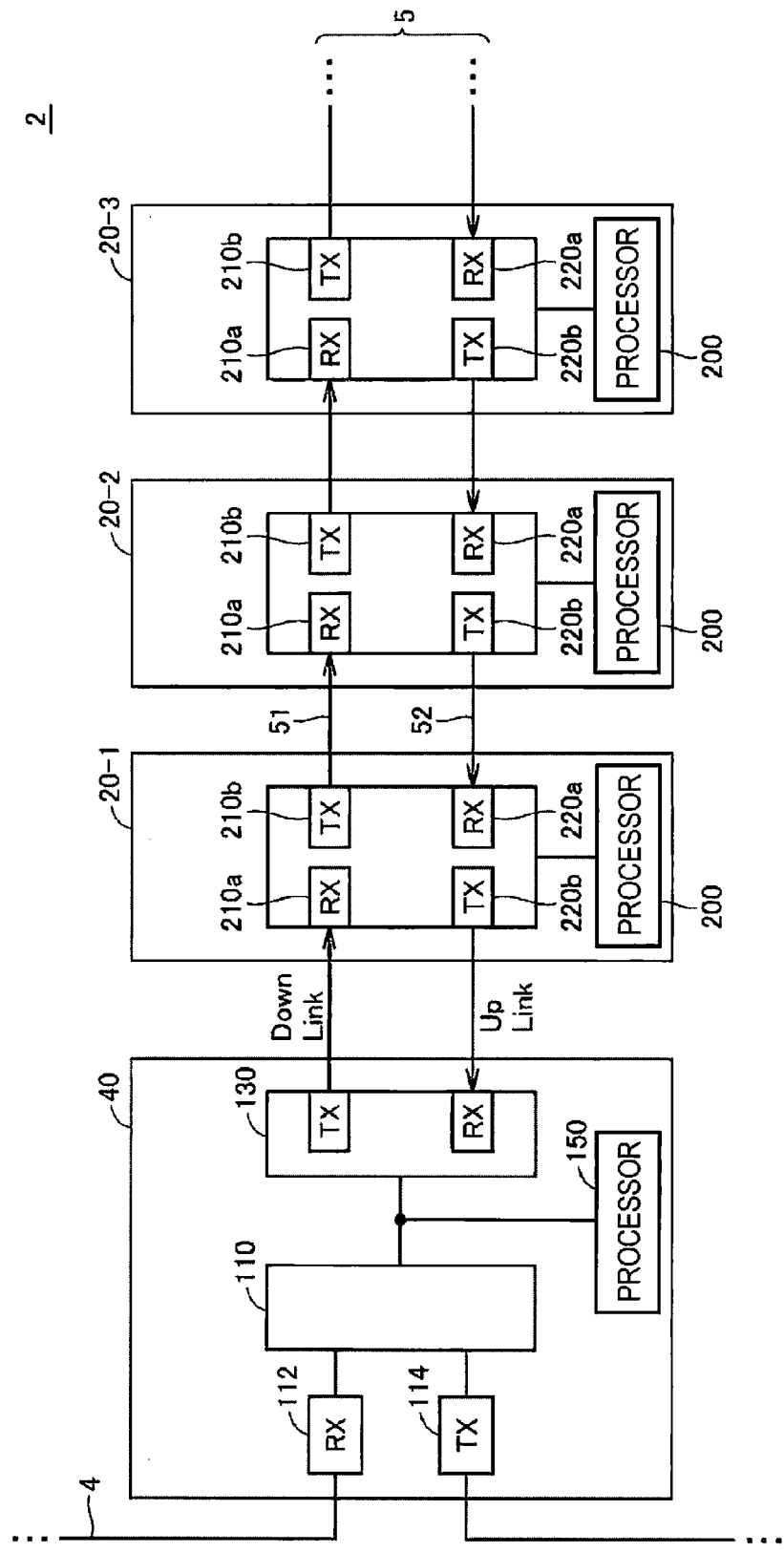
FIG. 5 is a schematic diagram illustrating the connection configuration of a main processing device of the embodiment of the present invention.
Figure 6:
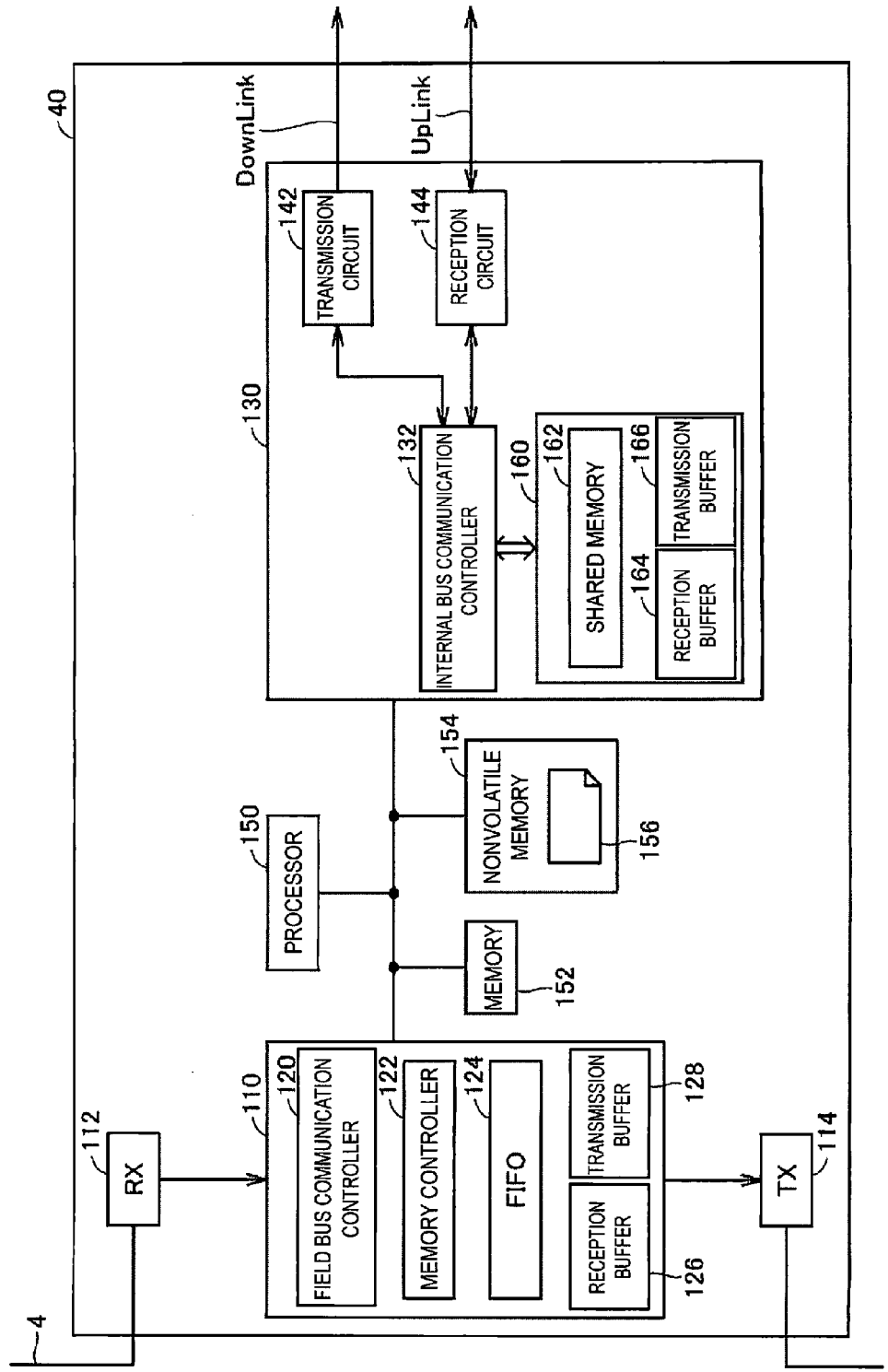
FIG. 6 is a schematic diagram illustrating the hardware configuration of a CPU unit constituting the main processing device of the embodiment of the present invention.

FIG. 5 is a schematic diagram illustrating the connection configuration of the main processing device 2 of the embodiment. FIG. 6 is a schematic diagram illustrating the hardware configuration of the CPU unit 40 constituting the main processing device 2 of the embodiment of the present invention.

D1: Connection Configuration

Referring to FIG. 5, in the main processing device 2, similarly to the remote IO device 3 (see FIG. 2), the CPU unit 40 and the IO units 20-1, 20-2, and 20-3 can transmit the data to one another through the internal bus 5 (downlink 51 and uplink 52) that is of the communication line. That is, the main processing device 2 includes a plurality of units (CPU unit 40 and IO units 20) that are connected to one another through the communication line.

When receiving the frame transmitted through the downlink 51 or the uplink 52, each IO unit 20 decodes the data from the frame to perform the necessary processing. Each IO unit 20 regenerates the frame, and retransmits (forwards) the frame to the IO unit 20 in the next stage. Each IO unit 20 includes the receiver (RX) 210a and the transmitter (TX) 210b with respect to the downlink 51, and the receiver 220a and the transmitter 220b with respect to the uplink 52.

The CPU unit 40 includes a processor 150, the field bus controller 110, the receiver 112, the transmitter 114, and the internal bus controller 130.

D2: Configuration of CPU Unit 40

Referring to FIG. 6, the CPU unit 40 of the main processing device 2 includes the processor 150, a main memory 152, a nonvolatile memory 154, the field bus controller 110, the receiver 112, the transmitter 114, and the internal bus controller 130. In the CPU unit 40, because the basic configuration related to the data transmission is similar to that of the master unit 10 (FIG. 2), the overlapping description of the corresponding component (designated by the identical numeral) is not repeated.

The processor 150 of the CPU unit 40 executes a user program related to target control. More specifically, the CPU unit 40 reads a user program 156 from the nonvolatile memory 154, and executes the user program 156 while expanding the user program 156 in the main memory 152. Based on the state value detected by the input section of the IO unit 20, the execution of the user program 156 sequentially calculates the state value that should be output from the output section of the IO unit 20.

D3: Configuration of IO Unit 20

Because the configuration of the IO unit 20 of the main processing device 2 is similar to that (see FIG. 4) of the IO unit 20 of the remote IO device 3, the detailed overlapping description is not repeated.

D4: Others

Desirably each of the components of the CPU unit 40 and the IO unit 20, which constitute the main processing device 2, is constructed by the hardware such as the ASIC and the FPGA from the viewpoint of processing speed enhancement. However, a part of or all the components may be mounted as the software.

E. Frame Structure

Figure 7:
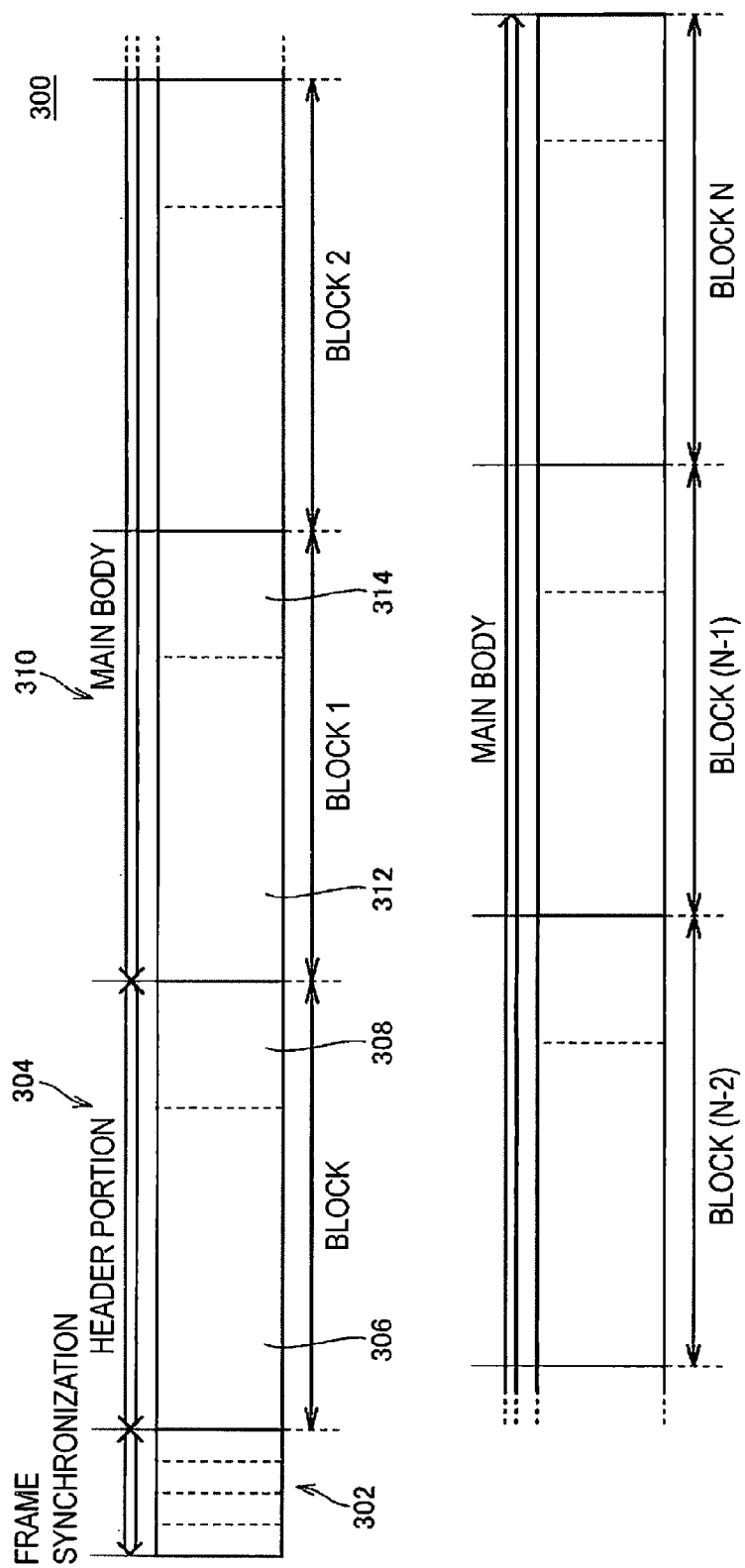
FIG. 7 is a schematic diagram illustrating a structure of a frame transmitted on an internal bus of the embodiment of the present invention.

The structure of the frame transmitted on the internal bus 5 of the PLC system 1 of the embodiment will be described below. FIG. 7 is a schematic diagram illustrating the structure of a frame 300 transmitted on the internal bus 5 of the embodiment of the present invention.

Referring to FIG. 7, the frame 300 is constructed by at least one frame boundary synchronous code 302 and at least one block. By way of example, the frame 300 in FIG. 7 includes four frame boundary synchronous codes 302 (frame synchronization) continuously disposed. The frame boundary synchronous code 302 means a head of the frame, and is constructed by four codes different from one another. The order in which the four codes different from one another are disposed is previously fixed, and a starting position of the frame is identified based on the order in which the codes are disposed. That is, the processing of receiving the subsequent frame is started only when the four frame boundary synchronous codes 302 are received in the predetermined disposition order.

When another frame interrupts the preceding frame, the value of the frame boundary synchronous code 302 and/or the disposition order may be varied between the preceding frame (normal frame) and the interrupt frame. Through the interrupt processing, the preceding frame is transmitted while temporally divided. However, the preceding frame can be detected on the reception side even in the anomalistic transmission.

A first block of the frame 300 is a header portion 304 in which the header information is stored, and at least one block (blocks from a second block) subsequent to the header portion 304 is a main body 310 in which the data of the transmission target is stored. Each block is constructed by a data portion and a correction code portion. As to the header portion 304, information indicating the data stored in the subsequent main body 310 is stored in a data portion 306, and a correction code for the data stored in the data portion 306 is stored in a correction code portion 308. Similarly, as to the main body 310, the transmission-target data divided into predetermined amount is partially stored in a data portion 312, and the correction code for the data stored in the data portion 312 is stored in a correction code portion 314.

For example, in the case that a Reed-Solomon code is used, an information symbol is allocated to the data portion 306, and a redundant symbol is allocated to the correction code portion 308. Typically, the redundant symbol is generated from the information symbol. An information amount (the number of symbols) stored in the correction code portion 308 is fixed according to necessary redundancy (correctable distance).

The CRC calculated from all the pieces of data of the transmission target may be stored as the frame check sequence in the final block (in the example of FIG. 7, a block N) of the frame. Therefore, whether the frame is correctly received can be determined on the reception side.

Attribute information on the data of the transmission target is stored in the header portion 304. The attribute information includes information indicating the priority for the data of the transmission target. In the embodiment, it is assumed that the priority is set into three stages as a typical example. Hereinafter, the priorities set into three stages are also referred to as a "high priority", a "middle priority", and a "low-priority" in the descending order. For example, the priorities may be indicated by values of "0", "1", and "2" using two bits.

F. Configuration Related to Priority-Dependent Data Transmission

Figure 8:
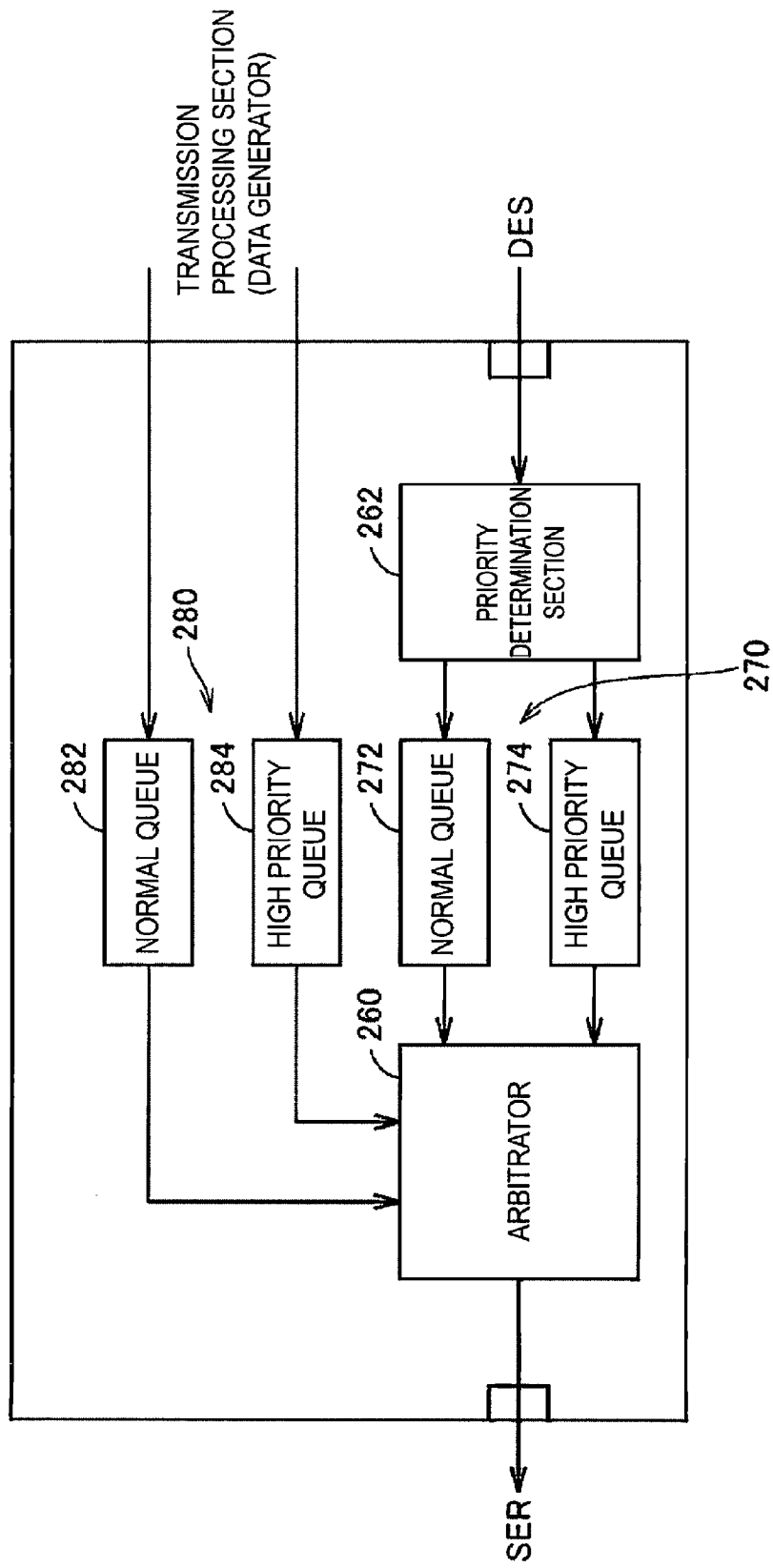
FIG. 8 is a schematic diagram illustrating a more specific configuration of a forward controller of the IO unit of the embodiment of the present invention.

The configuration related to the priority-dependent data transmission of the embodiment will be described below. FIG. 8 is a schematic diagram illustrating a more specific configuration of the forward controller of the IO unit 20 of the embodiment of the present invention.

Referring to FIG. 8, each of the forward controllers 214 and 224 includes an arbitrator 260, a priority determination section 262, a forward queue 270, and a transmission queue 280. Basically the forward queue 270 and the transmission queue 280 are constructed by a buffer memory in an FIFO format.

The frame received from the IO unit 20 in the preceding stage is input from the DES section 212 to the forward controller 214, or input from the DES section 222 to the forward controller 224. The frame output from the DES section 212 or the DES section 222 is converted into parallel data from the state (serial data) in which the pieces of data are arrayed in time series, and the pieces of data are simultaneously input in units of blocks.

The priority determination section 262 determines the priority for the data included in the input frame based on the header information included in the header portion 304 of the input frame. The forward queue 270 includes a normal queue 272 and a high-priority queue 274. The priority determination section 262 stores the frame set to the "high priority" in the high-priority queue 274, and stores the frame set to the "middle priority" or the "low priority" in the normal queue 272.

In the case that the data generated in the IO unit 20 is transmitted, the target data is temporarily stored in the transmission queue 280. The transmission queue 280 includes a normal queue 282 and a high-priority queue 284. In the case that the processor 200 and the transmission processing section 240 work together to generate the data that should be transmitted to another unit, the information indicating the priority is added to the generated data according to a data type. The data type is considered to be an attribute such as the frame that becomes various trigger or the frame that carries the normal data, as described below.

At this point, the transmission processing section 240 generates the frame from the generated data, and stores the frame in the normal queue 282 or the high-priority queue 284 depending on the priority for the data included in the frame.

The arbitrator 260 arbitrates the transmission order of the frames stored in the forward queue 270 (normal queue 272 and high-priority queue 274) and the transmission queue 280 (normal queue 282 and high-priority queue 284). More specifically, the priorities for the frames stored in the queues are compared to each other, and basically the frame is transmitted in the descending order of the priority.

Thus, each IO unit 20 includes the plurality of buffers (forward queue 270 and transmission queue 280). Based on the information indicating the priority included in the target data, the priority determination section 262 determines the buffer in which the data is stored with respect to at least one of the data included in the frame received by the receiver and the data generated by the data generator (transmission processing section 240 and processor 200).

How to determine the transmission order of the frame will be illustrated with respect to some situations.

G. Priority-Dependent Data Transmission

Basically, when the "high-priority" frame is received or generated while the "low-priority" frame or the "middle-priority" frame is transmitted, or when the "middle-priority" frame or the "high-priority" frame is received or generated while the "low-priority" frame is transmitted, the transmission is interrupted after the currently-transmitted frame is transmitted up to the predetermined block, and the transmission of the higher-priority frame is started.

G1: Example of Processing of Resuming Transmission of Interrupted Frame

FIGS. 9A, 9B, 10A, 10B, 11A and 11B are schematic diagrams illustrating processing examples of the priority-dependent data transmission of the embodiment of the present invention. FIGS. 9A, 9B, 10A, 10B, 11A and 11B illustrate examples in which the "high-priority" frame is received or generated during the transmission of the "low-priority" frame. In the processing examples in FIGS. 9A, 9B, 10A, 10B, 11A and 11B, the "high-priority" frame is preferentially transmitted, and the currently-transmitted "low-priority" frame is stopped and resumed after the transmission of the "high-priority" frame is completed.

Figure 9A:
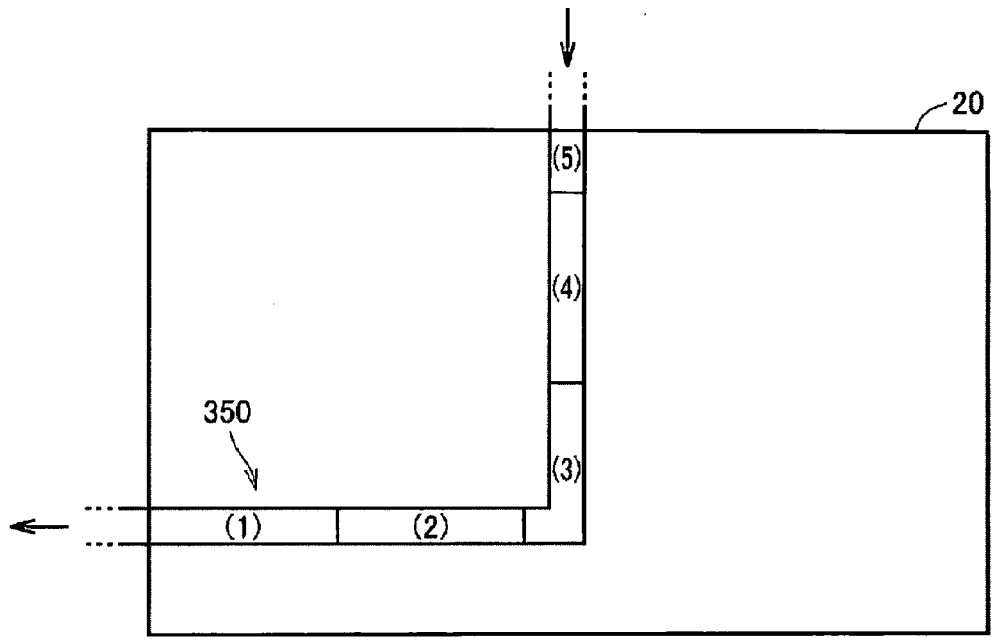
FIGS. 9A and 9B are schematic diagrams illustrating a processing example of priority-dependent data transmission of the embodiment of the present invention.
Figure 9B:
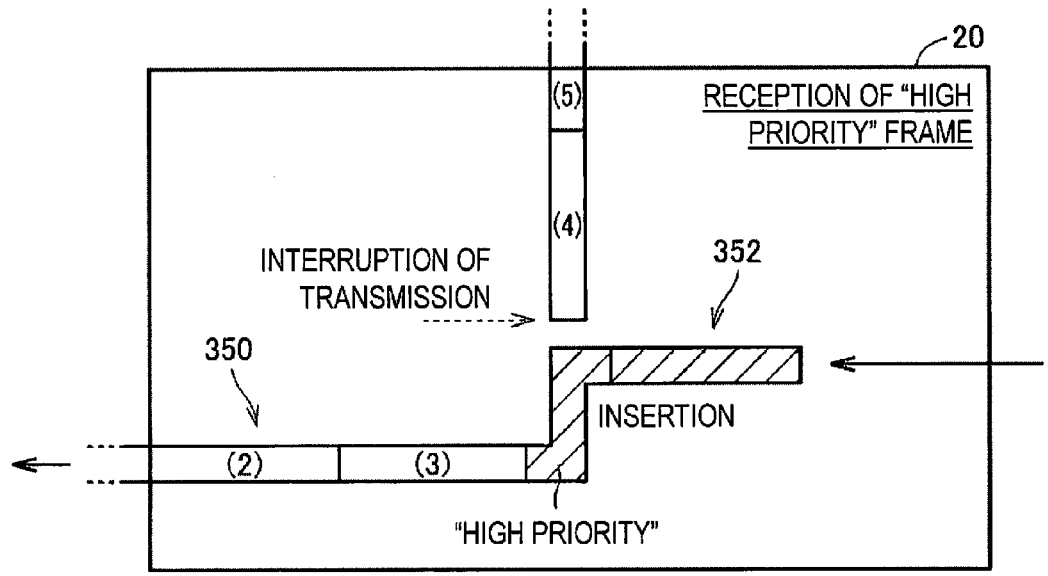

More specifically, FIG. 9A illustrates the state in which a "low-priority" frame 350 is generated in the own unit and sequentially transmitted after temporarily stored in the normal queue 282. FIG. 9B illustrates the processing example that is performed when a "high-priority" frame 352 is received from another unit in the state of FIG. 9A. In the processing example of FIG. 9B, as to the frame 350, the transmission is interrupted at a boundary between a third block and a fourth block, and the frame 352 is inserted in a position (or order) where the fourth block of the frame 350 is scheduled to be transmitted. That is, the "high-priority" frame 352 is first transmitted to the IO unit 20 in the next stage while overtaking the "low-priority" frame 350.

When the transmission of the frame 352 to the IO unit 20 in the next stage is completed, the transmission of the interrupted frame 350 is resumed. In the example of FIGS. 9A and 9B, the transmission of the frame 350 is normally completed even if the interruption is generated in midstream.

Figure 10A:
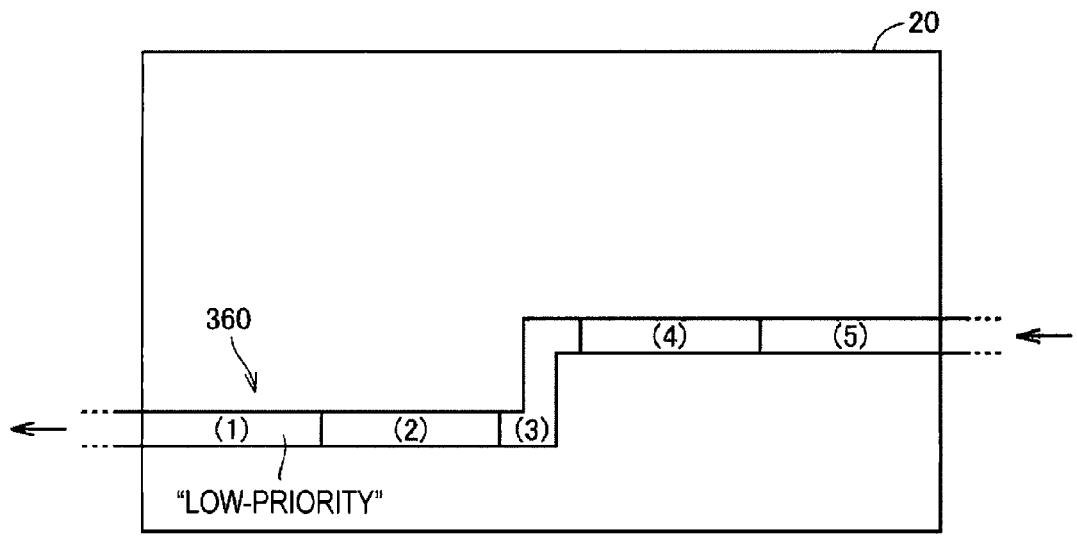
FIGS. 10A and 10B are schematic diagrams illustrating a processing example of the priority-dependent data transmission of the embodiment of the present invention.
Figure 10B:
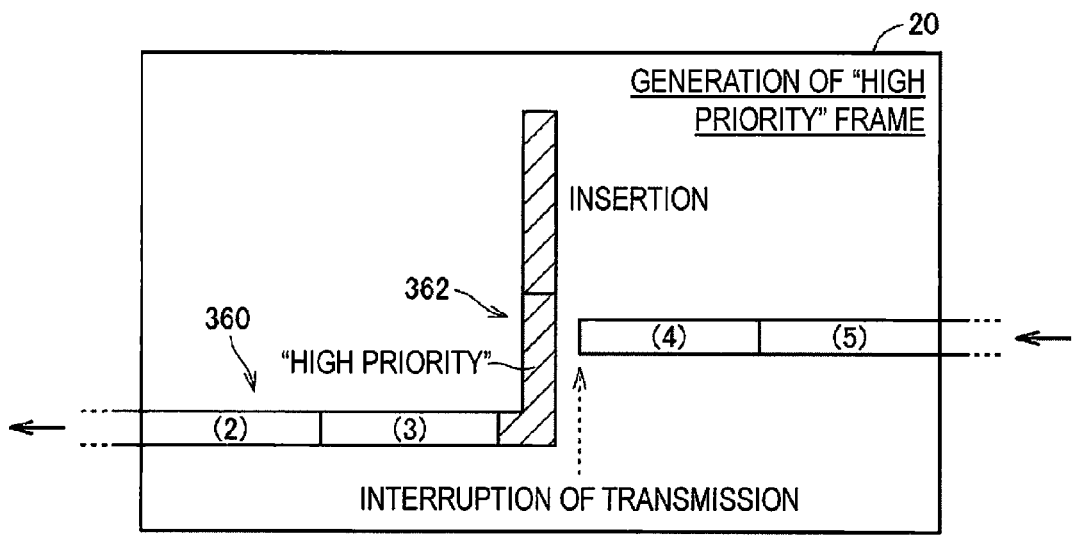

Similarly, FIG. 10A illustrates the state in which a "low-priority" frame 360 is received from the IO unit 20 in the preceding stage and sequentially transmitted after temporarily stored in the normal queue 272. FIG. 10B illustrates the processing example that is performed when a "high-priority" frame 362 is generated in the own unit in the state of FIG. 10A. In the processing example of FIG. 10B, as to the frame 360, the transmission is interrupted at the boundary between the third block and the fourth block, and the frame 362 is inserted in the position (or order) where the fourth block of the frame 360 is scheduled to be transmitted. That is, the "high-priority" frame 362 is first transmitted to the IO unit 20 in the next stage while overtaking the "low-priority" frame 360.

When the transmission of the frame 362 to the IO unit 20 in the next stage is completed, the transmission of the interrupted frame 360 is resumed. In the example of FIGS. 10A and 10B, the transmission of the frame 360 is normally completed even if the interruption is generated in midstream.

Figure 11A:
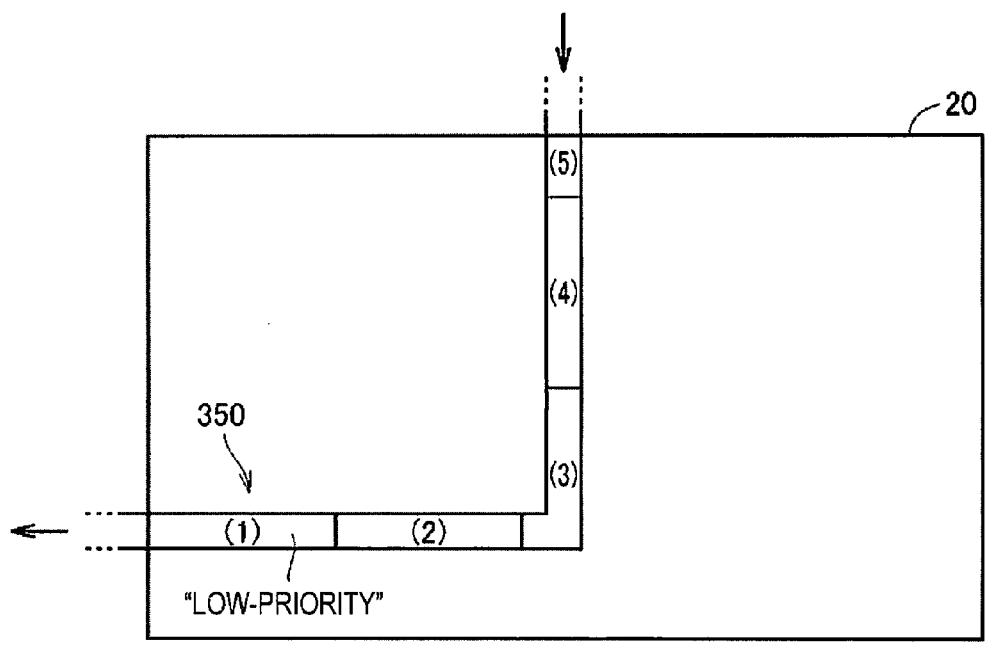
FIGS. 11A and 11B are schematic diagrams illustrating a processing example of the priority-dependent data transmission of the embodiment of the present invention.
Figure 11B:
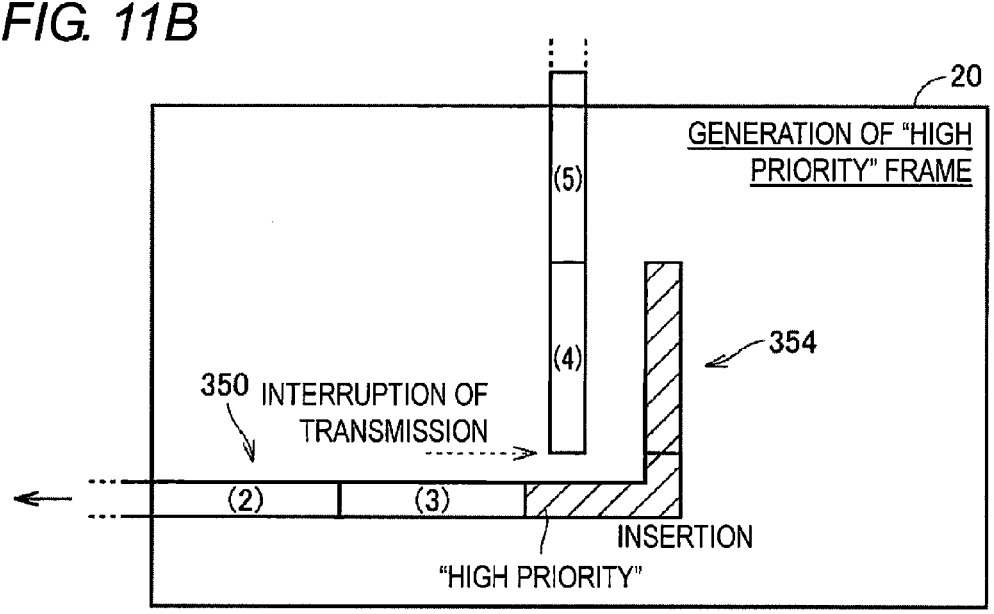

On the other hand, FIG. 11A illustrates the state in which the "low-priority" frame 350 is generated in the own unit and sequentially transmitted after temporarily stored in the normal queue 282. FIG. 11B illustrates the processing example that is performed when a "high-priority" frame 354 is generated in the own unit in the state of FIG. 11A. In the processing example of FIG. 11B, as to the frame 350, the transmission is interrupted at the boundary between the third block and the fourth block, and the frame 354 is inserted in the position (or order) where the fourth block of the frame 350 is scheduled to be transmitted. That is, the "high-priority" frame 354 is first transmitted to the IO unit 20 in the next stage while overtaking the "low-priority" frame 350.

When the transmission of the frame 354 to the IO unit 20 in the next stage is completed, the transmission of the interrupted frame 350 is resumed. In the example of FIGS. 11A and 11B, the transmission of the frame 350 is normally completed even if the interruption is generated in midstream.

Thus, even in the identical type of frames, the transmission order is changed depending on the priority. In the case that the "high-priority" frame is further received from another unit in the state in which the "low-priority" frame is received from the IO unit 20 in the preceding stage and sequentially transmitted after temporarily stored in the normal queue 272, the processing example is similar to that in FIGS. 11A and 11B. That is, even in this processing example, the "high-priority" frame is first transmitted to the IO unit 20 in the next stage while overtaking the "low-priority" frame.

When the higher-priority data to be transmitted is generated in the receiver or the controller while the transmitter of the IO unit 20 transmits the "low-priority" frame, the transmitter of the IO unit 20 transmits the "high-priority" frame including the data to be transmitted after transmitting the currently-transmitted "low-priority" frame up to the predetermined block. The transmitter of the IO unit 20 interrupts the transmission for the untransmitted blocks until the transmission of the interrupted "high-priority" frame is completed.

FIGS. 9A, 9B, 10A, 10B, 11A and 11B illustrate the processing examples in the case that the currently-transmitted frame has the "low priority" while the subsequently-generated frame has the "high priority". The similar processing can be performed in both (1) the case that the currently-transmitted frame has the "low-priority" while the subsequently-generated frame has the "middle priority" and (2) the case that the currently-transmitted frame has the "middle priority" while the subsequently-generated frame has the "high priority".

G2: Frame Structure During Interruption

The frame structure in the case that the interruption of the frame is generated as illustrated in FIGS. 9A, 9B, 10A, 10B, 11A and 11B will be described below.

Figure 12A:
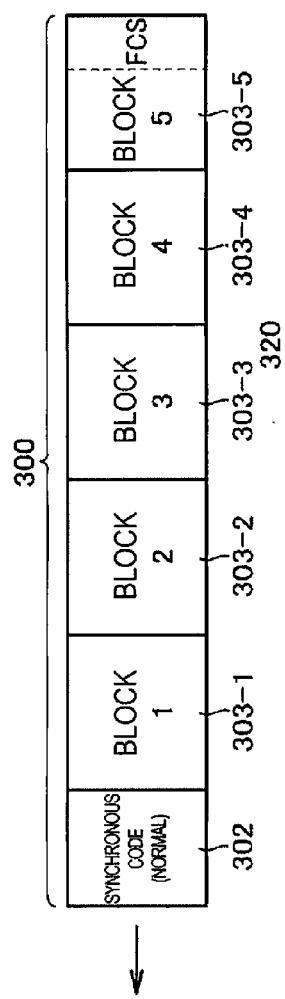
FIGS. 12A and 12B are schematic diagrams illustrating the frame structure when interruption of the frame is generated in the embodiment of the present invention.
Figure 12A:
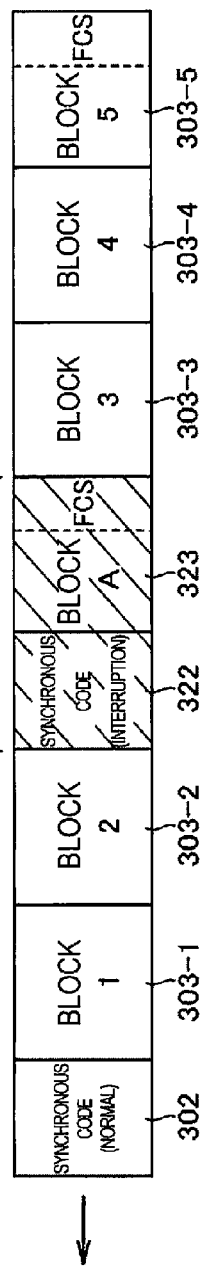
Figure 12B:
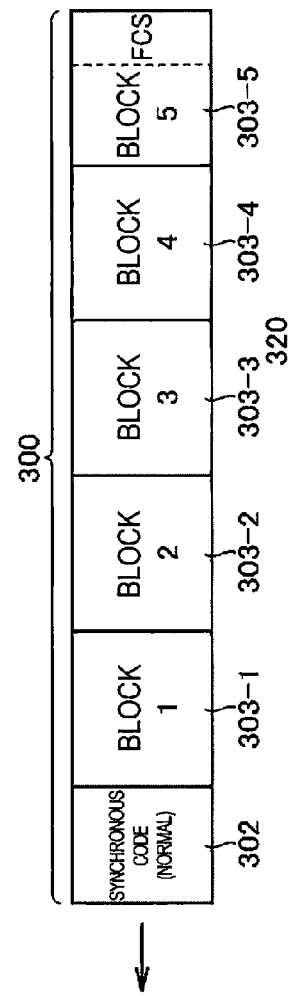
Figure 12B:
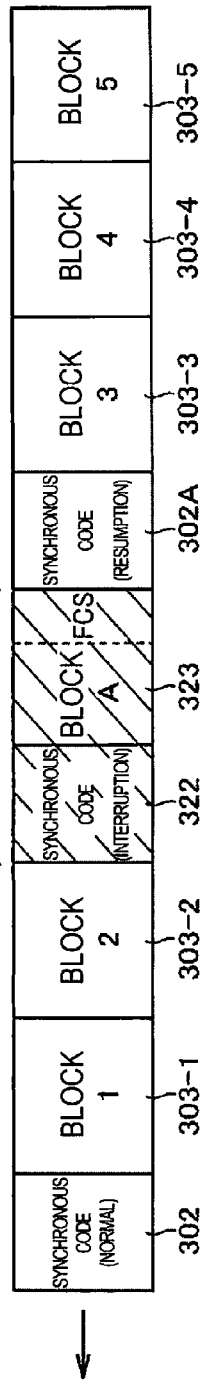

FIGS. 12A and 12B are schematic diagrams illustrating the frame structure when the interruption of the frame is generated in the embodiment of the present invention. FIGS. 12A and 12B illustrate the structure of the frame transmitted through the internal bus 5 when the interruption of a subsequent frame 320 is generated while the preceding frame 300 is transmitted.

As illustrated in FIG. 12A, the preceding frame 300 includes a frame boundary synchronous code 302 indicating starting of the normal frame and a plurality of blocks 303-1 to 303-5 subsequent to the frame boundary synchronous code 302. The Frame Check Sequence (FCS) is added to a final block 303-5 of the frame 300 in order to perform the error check. In the case that the frame 320 interrupts the frame 300, the frame 320 includes a frame boundary synchronous code 322 indicating the starting of the interrupt frame and a block 323 subsequent to the frame boundary synchronous code 322. Although the frame 320 includes the one block 323 for the sake of convenience, the frame 320 may include the plurality of blocks 323. The Frame Check Sequence (FCS) is also added to the final portion of the frame 320 in order to perform the error check.

As illustrated in FIG. 12A, the interruption of the frame 320 in the middle of the frame 300 can be detected by the frame boundary synchronous code 322 indicating the interrupt frame. At this point, because the frame 320 includes the amount of data included in the frame 320 as the header information, an ending position of the frame 320 can be identified on the reception side. Therefore, even if the third block 303-3 of the frame 300 is transmitted subsequent to the frame 320, the third block 303-3 can be transmitted while the frame 300 and the frame 320 are correctly distinguished from each other.

As illustrated in FIG. 12B, a frame boundary synchronous code 302A indicating the frame in which the transmission is resumed may be added to the end of the frame 320. Therefore, the frame 300 in which the transmission is resumed can correctly be received. That is, on the reception side, the starting position of the frame 320 can be identified by the frame boundary synchronous code 322, and then the starting position of the frame 300 in which the transmission is resumed can be identified by the frame boundary synchronous code 302A.

G3: Example of Processing of Discarding Interrupted Frame

FIGS. 9A, 9B, 10A, 10B, 11A and 11B illustrate the processing examples in the case that the transmission of the preceding frame in which the transmission is interrupted is resumed after the transmission of the interrupt frame is completed. In the case that the data cannot correctly be received, the processing of retransmitting the data is incorporated in the application that conducts communication using the frame. Therefore, in the data transmission processing on the internal bus 5, even if the untransmitted portion of the preceding frame in which the transmission is resumed is discarded, sometimes there is a little influence on the processing with the final application. Processing examples in the case that the transmission of the frame in which the transmission is interrupted is discarded will be described below.

FIGS. 13A, 13B, 14A, 14B, 15A and 15B are schematic diagrams illustrating processing examples of the priority-dependent data transmission of the embodiment of the present invention. FIGS. 13A, 13B, 14A, 14B, 15A and 15B illustrate examples in which the "middle-priority" frame is received or generated during the transmission of the "low-priority" frame. In the processing examples of FIGS. 13A, 13B, 14A, 14B, 15A and 15B, the "middle-priority" frame is preferentially transmitted, and the untransmitted portion of the currently-transmitted "low-priority" frame is discarded. The processing examples of FIGS. 13A, 13B, 14A, 14B, 15A and 15B are effectively used in the case of the relatively large number of blocks constituting the "middle-priority" frame. That is, it is considered that a probability of successful decoding on the reception side is lowered as transmission interruption time of the "low-priority" frame is lengthened.

Figure 13A:
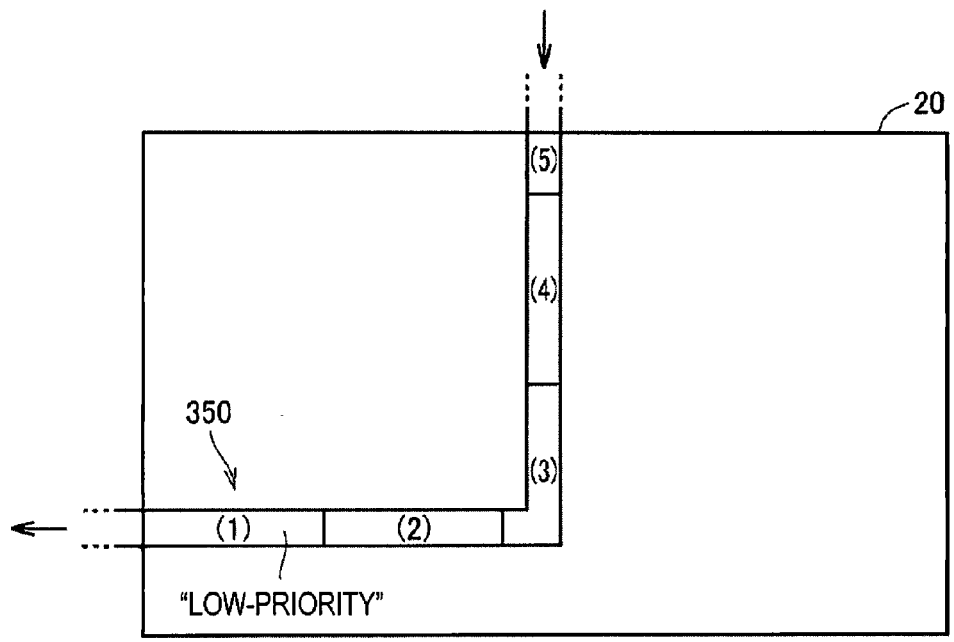
FIGS. 13A and 13B are schematic diagrams illustrating a processing example of the priority-dependent data transmission of the embodiment of the present invention.
Figure 13B:
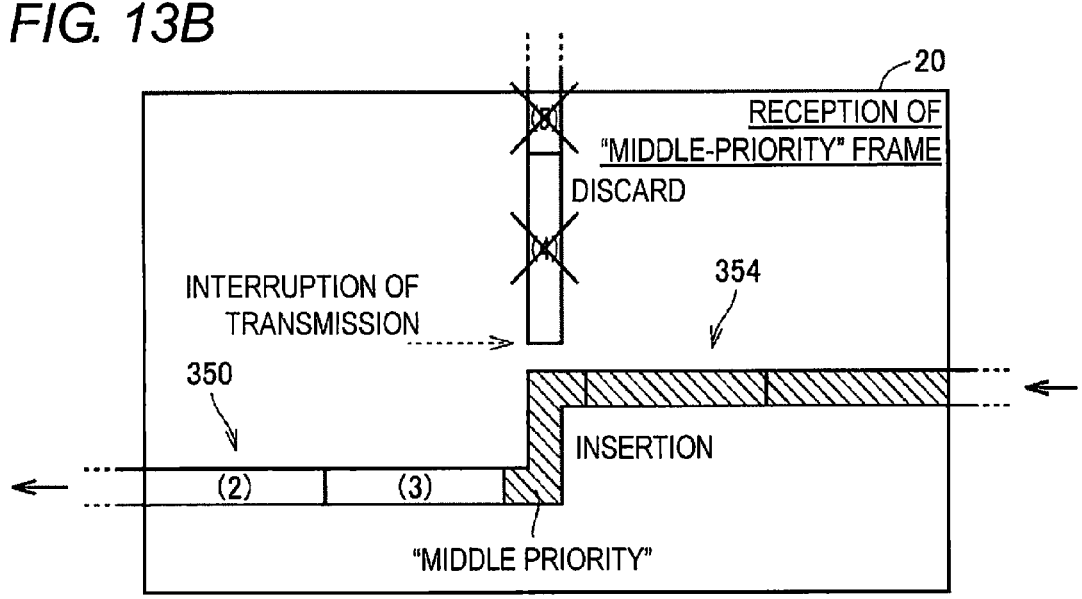

More specifically, FIG. 13A illustrates the state in which the "low-priority" frame 350 is generated in the own unit and sequentially transmitted after temporarily stored in the normal queue 282. FIG. 13B illustrates the processing example that is performed when the "middle-priority" frame 354 is received from another unit in the state of FIG. 13A. In the processing example of FIG. 13B, as to the frame 350, the transmission is interrupted at the boundary between the third block and the fourth block, and the frame 354 is inserted in the position (or order) where the fourth block of the frame 350 is scheduled to be transmitted. That is, the "middle-priority" frame 354 is first transmitted to the IO unit 20 in the next stage while overtaking the "low-priority" frame 350. At this point, the third and fourth blocks that are of the untransmitted portions are discarded in the frame 350 in which the transmission is interrupted.

Figure 14A:
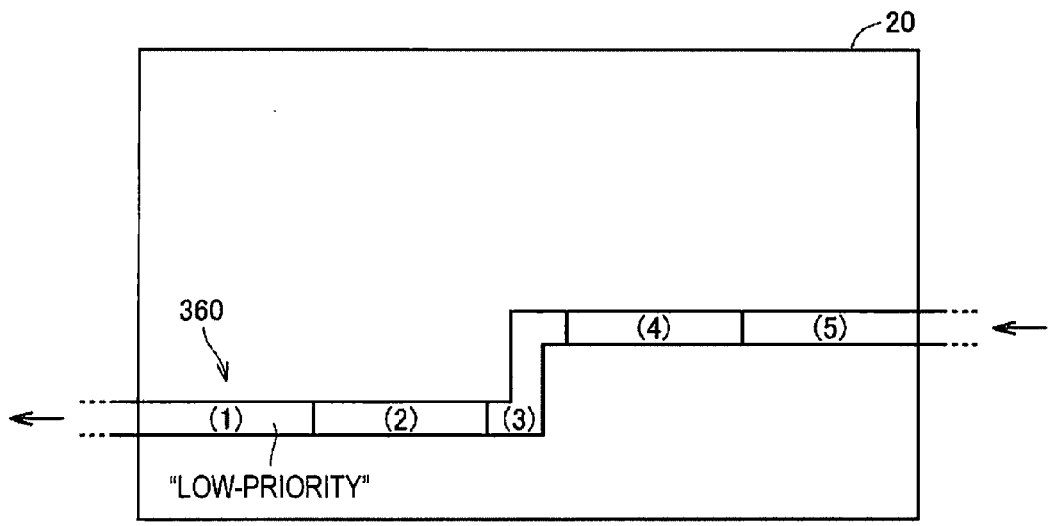
FIGS. 14A and 14B are schematic diagrams illustrating a processing example of the priority-dependent data transmission of the embodiment of the present invention.
Figure 14B:
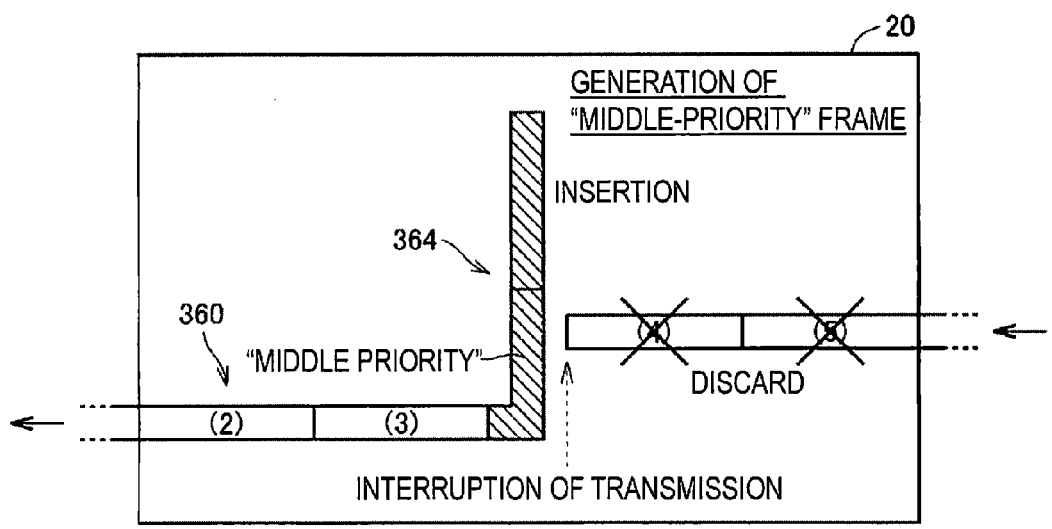

Similarly, FIG. 14A illustrates the state in which the "low-priority" frame 360 is received from the IO unit 20 in the preceding stage and sequentially transmitted after temporarily stored in the normal queue 272. FIG. 14B illustrates the processing example that is performed when the "middle-priority" frame 364 is generated in the own unit in the state of FIG. 14A. In the processing example of FIG. 14B, as to the frame 364, the transmission is interrupted at the boundary between the third block and the fourth block, and the frame 364 is inserted in the position (or order) where the fourth block of the frame 360 is scheduled to be transmitted. That is, the "middle-priority" frame 364 is first transmitted to the IO unit 20 in the next stage while overtaking the "low-priority" frame 360. At this point, the third and fourth blocks that are of the untransmitted portions are discarded in the frame 360 in which the transmission is interrupted.

Figure 15A:
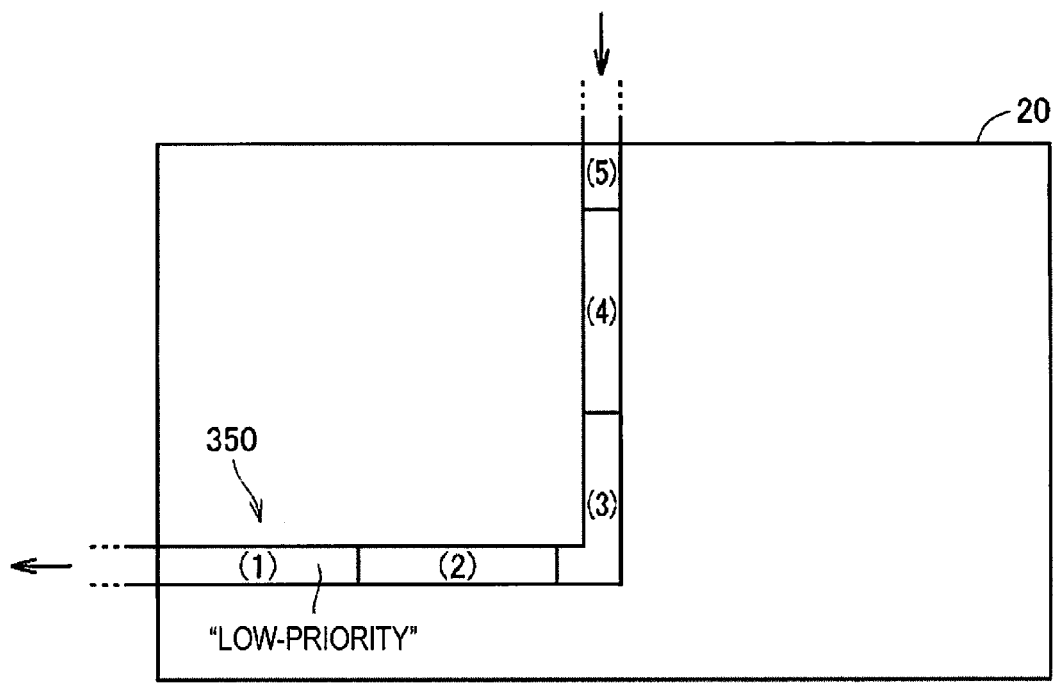
FIGS. 15A and 15B are schematic diagrams illustrating a processing example of the priority-dependent data transmission of the embodiment of the present invention.
Figure 15B:
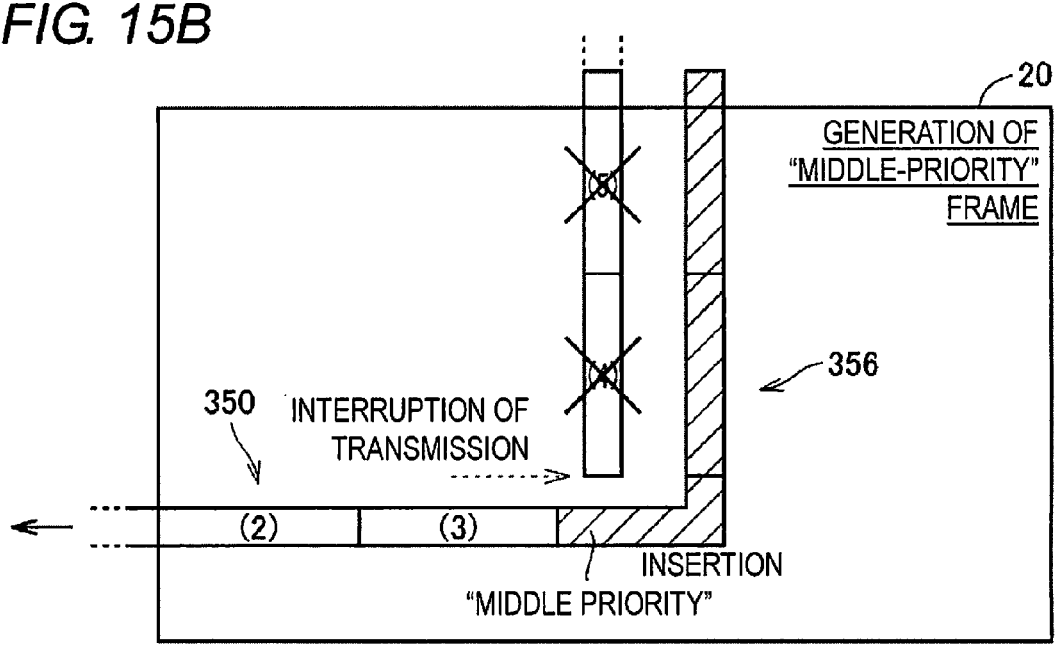

On the other hand, FIG. 15A illustrates the state in which the "low-priority" frame 350 is generated in the own unit and sequentially transmitted after temporarily stored in the normal queue 282. FIG. 15B illustrates the processing example that is performed when a "middle-priority" frame 356 is generated in the own unit in the state of FIG. 15A. In the processing example of FIG. 15B, as to the frame 350, the transmission is interrupted at the boundary between the third block and the fourth block, and the frame 356 is inserted in the position (or order) where the fourth block of the frame 350 is scheduled to be transmitted. That is, the "middle-priority" frame 356 is first transmitted to the IO unit 20 in the next stage while overtaking the "low-priority" frame 350. At this point, the third and fourth blocks that are of the untransmitted portions are discarded in the frame 350 in which the transmission is interrupted.

Thus, even in the identical type of frames, the untransmitted portion of the frame in which the transmission is interrupted is discarded while the transmission order is changed depending on the priority. In the case that the "middle-priority" frame is further received from another unit in the state in which the "low-priority" frame is received from the IO unit 20 in the preceding stage and sequentially transmitted after temporarily stored in the normal queue 272, the processing example is similar to that in FIGS. 11A and 11B. That is, even in this processing example, the "middle-priority" frame is first transmitted to the IO unit 20 in the next stage while overtaking the "low-priority" frame.

As described above, when the high-priority data to be transmitted is generated in the receiver or the controller while the transmitter of the IO unit 20 transmits the "low-priority" frame, the transmitter of the IO unit 20 transmits the "middle priority" frame including the data to be transmitted after transmitting the currently-transmitted "low-priority" frame up to the predetermined block. The transmitter of the IO unit 20 discards the untransmitted portion of the "low-priority" frame.

FIGS. 13A, 13B, 14A, 14B, 15A and 15B illustrate the processing examples in the case that the currently-transmitted frame has the "low priority" while the subsequently-generated frame has the "middle priority". The similar processing can be performed in both (1) the case that the currently-transmitted frame has the "low-priority" while the subsequently-generated frame has the "high priority" and (2) the case that the currently-transmitted frame has the "middle priority" while the subsequently-generated frame has the "high priority".

G4: Example of Processing of Overtaking Frame

As described above in FIG. 8, the low-priority" and "middle-priority" frames are stored in the normal queue 272 or 282, and the "high-priority" frame is stored in the high-priority queue 274 or 284. Even if the "low-priority" or "middle priority" frame is first stored in the normal queue 272 or 282, the subsequent "high-priority" frame can first be transmitted to the IO unit 20 in the next stage. That is, the subsequent frame can be transmitted while overtaking the frame having the relatively low priority. An example of the processing of overtaking the frame having the relatively low priority will be described below.

Figure 16A:
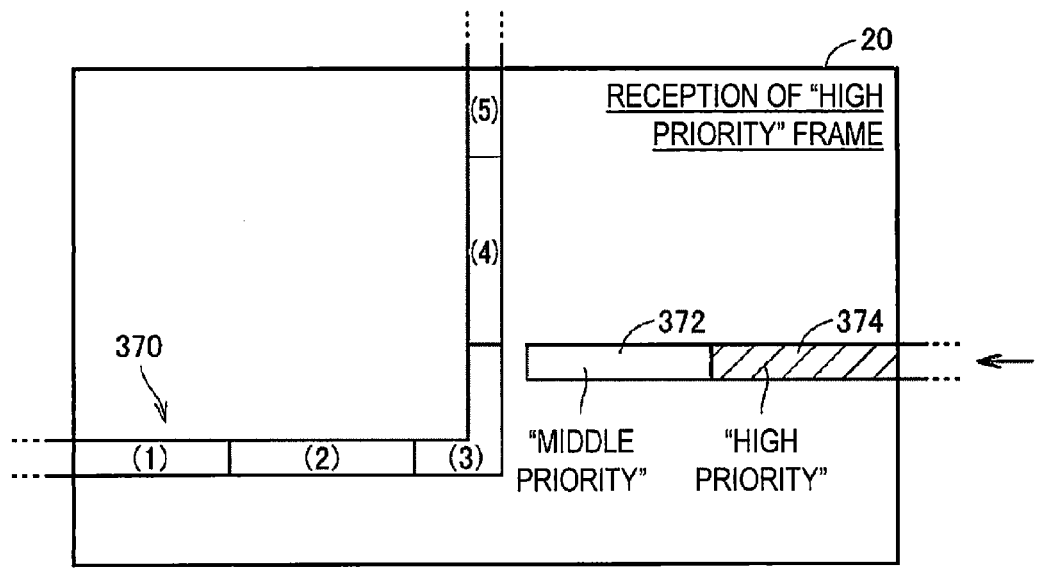
FIGS. 16A and 16B are schematic diagrams illustrating a processing example of the priority-dependent data transmission of the embodiment of the present invention.
Figure 16B:
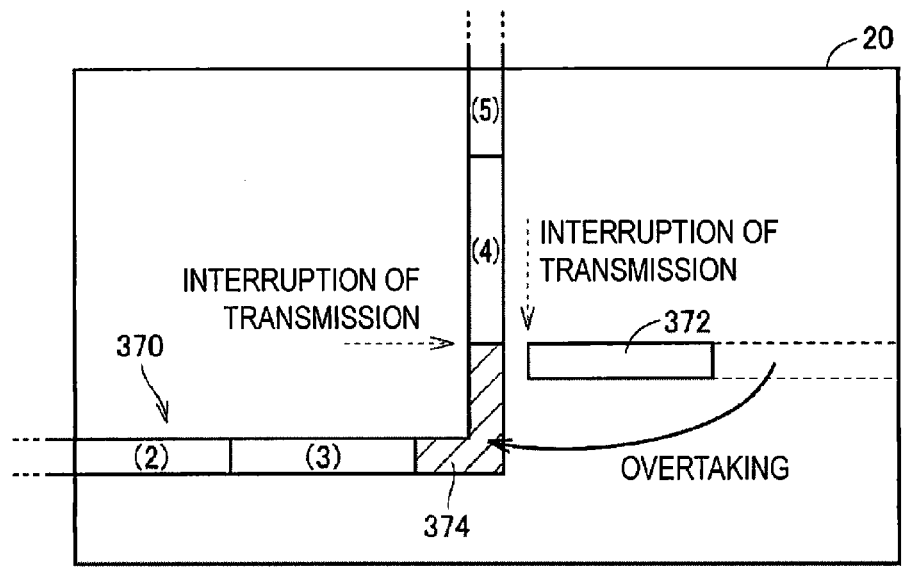

FIGS. 16A and 16B are schematic diagrams illustrating a processing example of the priority-dependent data transmission of the embodiment of the present invention. FIG. 16A illustrates the state in which a "middle-priority" frame 370 is generated in the own unit and sequentially transmitted after temporarily stored in the normal queue 282. FIG. 16A also illustrates the state in which the IO unit 20 receives a "middle-priority" frame 372 from the IO unit 20 in the preceding stage and waits for the completion of the transmission of the frame 370 after temporarily storing the frame 372 in the normal queue 282.

It is assumed that a "high-priority" frame 374 is received from another unit in the state of FIG. 16A. In this case, after overtaking the previously-stored frame 372, the "high-priority" frame 374 input later is inserted in the position (or order) where the fourth block of the frame 350 is scheduled to be transmitted. The transmission of the frame 370 is interrupted at the boundary between the third block and the fourth block thereof. Thus, the "high-priority" frame 374 is first transmitted to the IO unit 20 in the next stage while overtaking the currently-transmitted "middle-priority" frame 370 and the previously stored "middle-priority" frame 372.

As described above, when the data to be transmitted is generated while the "middle-priority" frame waiting to be transmitted exists, and when the priority of the data included in the frame waiting to be transmitted is lower than that of the data to be transmitted, the transmitter of the IO unit 20 transmits the "high-priority" frame in advance of the "middle-priority" frame. Although FIGS. 16A and 16B illustrate the processing example in the case that the frame previously stored in the normal queue has the "middle priority", the processing can be performed by the similar procedure even if the frame has the "low priority".

Although FIGS. 16A and 16B illustrate the processing example in the case that the one "middle-priority" frame 372 is stored in the normal queue 282, the similar processing is performed even if the plurality of "low-priority" or "middle priority" frames are stored in the normal queue 282. The similar processing is also performed when the new frame is generated while the frame generated in the IO unit 20 is stored in the normal queue 272.

G5: Processing Example in the Case that Frames Having Identical Priority Compete with Each Other The transmission order between the frames having different priorities is described in the above processing examples. On the other hand, the processing in the case that the frames having the identical priority compete with each other will be described below. In the frames having the identical priority, a first-in first-out rule is applied in principle. That is, the frame first stored in one of the queues is first transmitted.

Figure 17A:
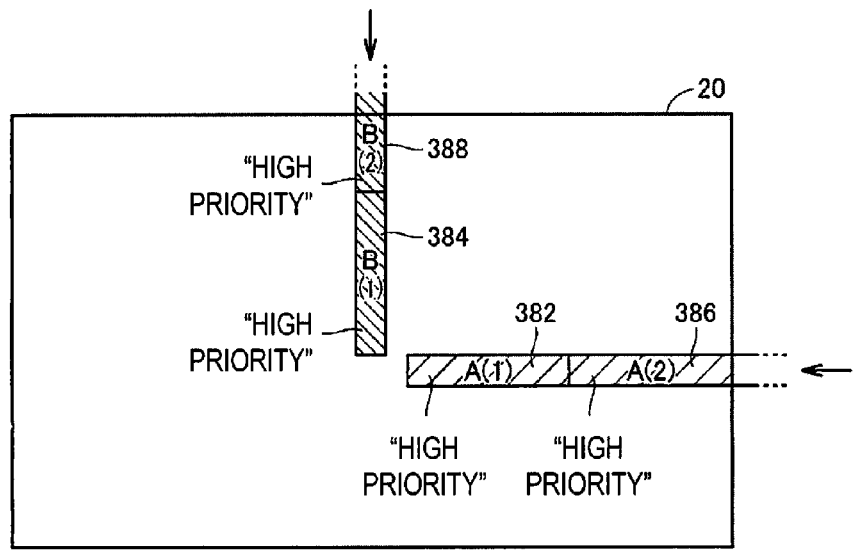
FIGS. 17A and 17B are schematic diagrams illustrating a processing example of the priority-dependent data transmission of the embodiment of the present invention.
Figure 17B:
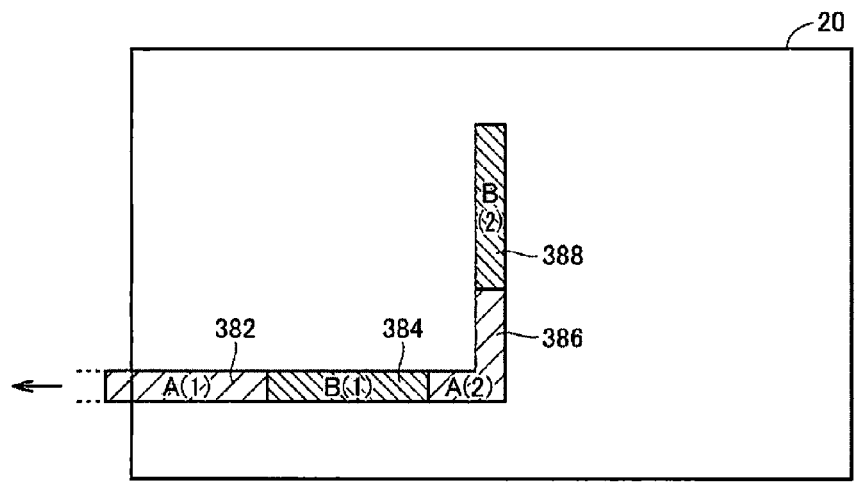

FIGS. 17A and 17B are schematic diagrams illustrating a processing example of the priority-dependent data transmission of the embodiment of the present invention. In FIG. 17A, it is assumed that a "high-priority" frame 384 generated in the own unit is stored in the high-priority queue 284 after a "high-priority" frame 382 received from the IO unit 20 in the preceding stage is stored in the high-priority queue 274. It is also assumed that, after that, a "high-priority" frame 388 generated in the own unit is stored in the high-priority queue 284 after a "high-priority" frame 386 received from the IO unit 20 in the preceding stage is stored in the high-priority queue 274.

In this situation, as illustrated in FIG. 17A, the "high-priority" frames 382, 384, 386, and 388 are sequentially transmitted in the temporal order in which the "high-priority" frames 382, 384, 386, and 388 are stored in the high-priority queue 274 or 284.

As described above, when the data to be transmitted is generated while the "high-priority" frame waiting to be transmitted exists, and when the priority of the data included in the "high-priority" frame is equal to that of the data to be transmitted, the transmitter of the IO unit 20 transmits the frame including the data to be transmitted after transmitting the "high-priority" frame.

G6: Processing in Master Controller

In the above processing examples, the data is generated in the IO unit 20. The similar processing is performed in the case that the data is generated in the master unit 10 or the CPU unit 40.

Figure 18A:
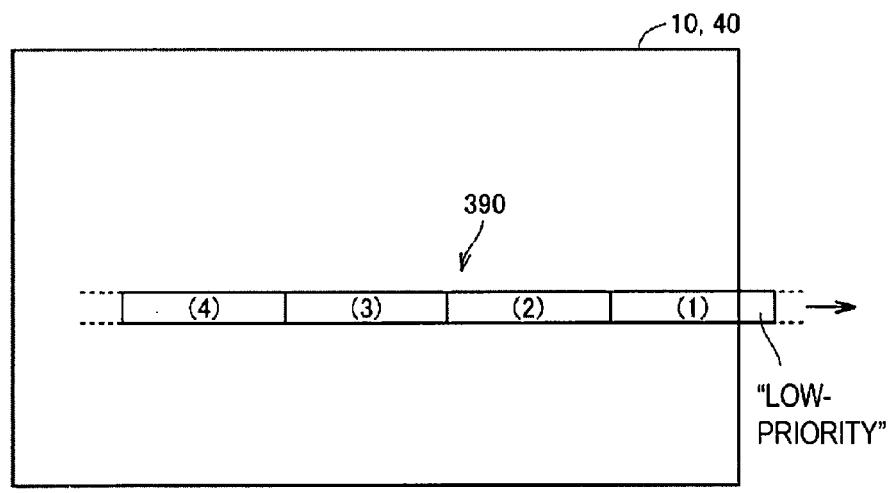
FIGS. 18A and 18B are schematic diagrams illustrating a processing example of the priority-dependent data transmission of the embodiment of the present invention.
Figure 18B:
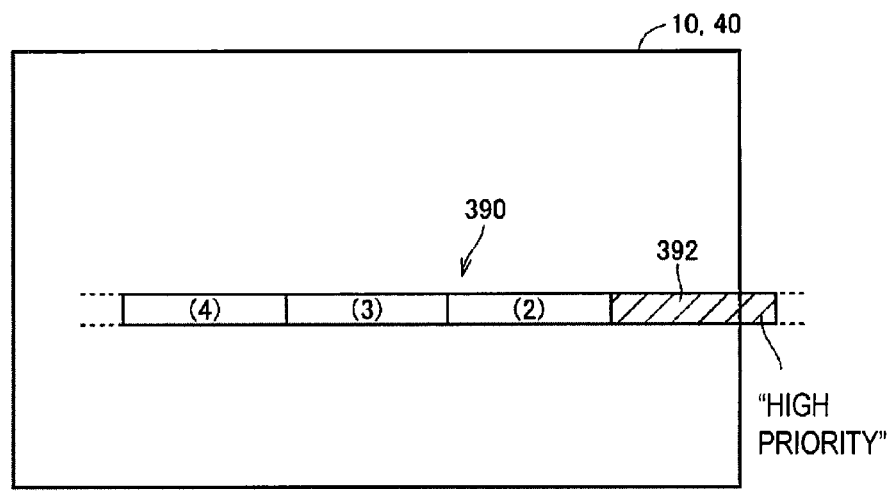

FIGS. 18A and 18B are schematic diagrams illustrating a processing example of the priority-dependent data transmission of the embodiment of the present invention. Referring to FIG. 18A, it is considered that the master unit 10 or the CPU unit 40 transmits a "low-priority" frame 390 through the downlink 51. At this point, in the case that the processor 150 and the internal bus controller 130 work together to generate the data that should be transmitted to the IO unit 20, the frame including the generated data is caused to interrupt between the frames transmitted to the IO unit 20.

As illustrated in FIG. 18B, in the case that the data to be transmitted has the high priority, a "high-priority" frame 392 is generated, the transmission of the currently-transmitted frame 390 is interrupted, and the frame 392 is inserted. The frame 392 is inserted in the position (or order) where the second block of the frame 390 is scheduled to be transmitted. That is, the "high-priority" frame 392 is first transmitted to the IO unit 20 while overtaking the "low-priority" frame 390.

Similarly to the case that the data is generated in the IO unit 20, the information indicating the priority is added to the data (frame) according to the data type.

H. Processing Procedure

A processing procedure related to the priority-dependent data transmission will be described below. FIG. 19 is a flowchart illustrating a processing procedure of the priority-dependent data transmission of the embodiment of the present invention. Basically the arbitrator 260 (see FIG. 8) of the forward controller 214 or 224 performs each step in FIG. 19.

Referring to FIG. 19, when the frame is received from another unit or when the frame is generated in the IO unit 20 (YES in Step S100), the frame is stored in the normal queue or the high priority queue depending on the priority of the data included in the frame (Step S102).

The arbitrator 260 determines whether the storage destination of the new frame is the high priority queue (Step S104). When the storage destination of the new frame is not the high priority queue (NO in Step S104), the arbitrator 260 determines whether the currently-transmitted frame exists (Step S106). When the currently-transmitted frame does not exist (NO in Step S106), the arbitrator 260 selects and transfers the frame earliest stored in the queue (Step S108). Then the pieces of processing from Step S100 are performed.

On the other hand, when the currently-transmitted frame does exists (YES in Step S106), the arbitrator 260 determines the priority of the data included in the new frame (Step S112). When the data included in the new frame has the "low priority" ("low priority" in Step S112), the transmission of the currently-transmitted frame is continued (Step S114). Then the pieces of processing from Step S100 are performed.

On the other hand, when the data included in the new frame has the "middle priority" ("middle priority" in Step S112), the arbitrator 260 determines the priority of the data included in the currently-transmitted frame (Step S118). When the data included in the currently-transmitted frame has the "low priority" ("low priority" in Step S118), the arbitrator 260 interrupts the currently-transmitted frame, and causes the new frame to interrupt the currently-transmitted frame (Step S120). The arbitrator 260 discards the untransmitted portion of the currently-transmitted frame (Step S122). Then the pieces of processing from Step S100 are performed.

When the data included in the currently-transmitted frame has the "middle priority" ("middle priority" in Step S118), the processing in Step S114 is performed.

On the other hand, when the storage destination of the new frame is the high priority queue (YES in Step S104), the arbitrator 260 determines whether the currently-transmitted frame exists (Step S124). When the currently-transmitted frame does not exist (NO in Step S124), the arbitrator 260 selects and transfers the frame newly stored in the high priority queue (Step S126). Then the pieces of processing from Step S100 are performed.

When the currently-transmitted frame exists (YES in Step S124), the arbitrator 260 determines the priority of the data included in the currently-transmitted frame (Step S128). When the data included in the currently-transmitted frame has the "middle priority" or "low-priority" ("middle priority" or "low priority" in Step S128), the arbitrator 260 interrupts the currently-transmitted frame, and causes the new frame to interrupt the currently-transmitted frame (Step S130). Then the pieces of processing from Step S100 are performed.

When the data included in the currently-transmitted frame has the "high priority" ("high priority" in Step S128), the transmission of the currently-transmitted frame is continued (Step S132). Then the pieces of processing from Step S100 are performed.

I. Application Example

An application example of the priority-dependent data transmission will be described below.

I1: Transfer Method in Internal Bus

Typically the following transfer methods can be adopted in the internal bus 5 of the embodiment.

(1) A method for concurrently transferring the data to all the slave controllers (IO units 20) connected to the master controller (master unit 10 or CPU unit 40) (multicast or broadcast). In the transfer method, the data frame transmitted through the downlink 51 by the master controller is transferred among all the slave controllers.

(2) A method for transferring the data to the specific slave controller connected to the master controller (address designation transfer). In the transfer method, the data frame transmitted through the downlink 51 by the master controller is continuously transferred until arriving at the address slave controller, but the data is not transferred to the slave controller in the next stage at a time point the data arrives at the address slave controller.

(3) A method in which the slave controller transfers the data to the master controller in response to a request from the master controller (normal transfer). In the transfer method, one of the slave controllers transfers the data frame transmitted through the uplink 52 to the master controller.

(4) A method in which the slave controller transfers the data to the master controller on condition that the master controller provides a transmission right to the slave controller (message transfer). The master controller transmits a data frame (hereinafter also referred to as a "TRG_frame (MSG)") including a command to provide the transmission right to the slave controller. In the transfer method, first the master controller provides the transmission right for the uplink 52 to one of the slave controllers. The slave controller to which the transmission right is provided transfers the data frame transmitted through the uplink 52 to the master controller.

In the internal bus 5 in which the transfer methods are adopted, low power consumption can be implemented by using the priority-dependent data transfer of the embodiment. The processing of implementing the low power consumption will be described below.

I2: Basic Thought Related to Low Power Consumption

For basic thought, the master controller transmits a command to inactivate the uplink to the slave controller through the downlink when completing the data transmission from the slave controller through the uplink. In response to the command, the slave controller inactivates the uplink to be able to reduce the power consumption of the data transmission. In the case that the data is acquired from the slave controller, the master controller transmits the command to activate the uplink to the slave controller through the downlink. In response to the command, the slave controller inactivates the uplink to be able to transmit the data to the master controller. The slave controller is activated only in a period necessary to transmit the data in response to the command from the master controller, so that the unnecessary power consumption can be avoided.

Desirably the master controller transmits the activation command and the inactivation command to slave controller as soon as possible. The time for which the master controller receives the data can be shortened by rapidly transmitting the activation command, and the more power consumption can be reduced by rapidly transmitting the inactivation command.

I3: Processing Procedure Related to Low Power Consumption

An example in which the basic thought is applied to the internal bus 5 of the remote IO device 3 will be described below. While the downlink 51 is always kept active, the uplink 52 (receiver 220a and transmitter 220b in FIG. 2) is activated only in the period necessary for the communication.

FIGS. 20A and 20B are views illustrating a method for implementing low power consumption in the remote IO device 3 using the priority-dependent data transmission of the embodiment of the present invention. FIG. 20A illustrates the state in which both the downlink 51 and the uplink 52 are active, and FIG. 20B illustrates the state in which the downlink 51 is maintained in the active state while the uplink 52 is inactive.

At this point, the master unit 10 acting as the master controller includes the reception circuit (reception circuit 144 in internal bus controller 130) receiving the signal transmitted through the uplink 52, and the power supply for the reception circuit 144 is cut off in the period during which the uplink 52 is inactivated. Therefore, the power consumption can be reduced in not only the IO unit 20 but also the CPU unit 40.

In the application example, the state in FIG. 20B is maintained as much as possible to reduce the power consumption. On the other hand, the downlink 51 is maintained in the active state to facilitate the active/inactive control of the uplink 52.

Through the field bus 4 that is of the upper-level communication network, the remote IO device 3 transmits the state value (IN data) collected by the input section of the own device to the main processing device 2 while receiving the OUT data from the main processing device 2. The upper-level communication frame is periodically transmitted on the field bus 4. In the application example, the data is updated based on timing of the arrival of the upper-level communication frame.

More specifically, based on the OUT data included in the arrived upper-level communication frame, the output value of the IO module 206 (see FIG. 4) is updated (hereinafter also referred to as "OUT data refresh"). In advance of the arrival of the next upper-level communication frame, the latest state value (IN data) detected by the IO module 206 (see FIG. 4) is transferred to the master unit 10 (hereinafter also referred to as "IN data refresh"). Therefore, the latest state value (IN data) can be written in the upper-level communication frame when the upper-level communication frame arrives.

The master controller controls the activation/inactivation of the uplink 52 through the downlink 51. More specifically, the master unit 10 acting as the master controller transmits the data frame (hereinafter also referred to as a "WakeUP_frame") including the command to activate the inactive receiver 220*a* and transmitter 220*b* and the data frame (hereinafter also referred to as a "PowerDown_frame") including the command to inactivate the active receiver 220*a* and transmitter 220*b* through the downlink 51. The IO unit 20 receiving one of the data frames performs the designated processing (activation/inactivation of receiver 220*a* and transmitter 220*b*).

A communication schedule on the internal bus 5 in the application example will be described below with reference to a timing chart.

FIGS. 21A-21E are timing charts illustrating a communication procedure in the remote IO device 3 using the priority-dependent data transmission of the embodiment. FIGS. 21A-21E illustrate the communication procedure in the case that the OUT data refresh and the IN data refresh are performed every time an upper-level communication frame 400 arrives. Therefore, the communication procedure in FIG. 8 is repeated every control period T1 of the field bus 4. It is assumed that the uplink 52 is in the inactive state immediately before the upper-level communication frame 400 arrives.

FIG. 21A illustrates the data frame transmitted through the field bus 4 that is of an upper-level communication network. FIG. 21B illustrates the data frame transmitted through the downlink 51 between the master unit 10 and the first IO unit 20-1. FIG. 21C illustrates the data frame transmitted through the uplink 52 between the first IO unit 20-1 and the master unit 10. FIG. 21D illustrates the data frame transmitted through the downlink 51 between the first IO unit 20-1 and the second IO unit 20-2. FIG. 21E illustrates the data frame transmitted through the uplink 52 between the second IO unit 20-2 and the first IO unit 20-1.

When the upper-level communication frame 400 arrives to complete the reception thereof, the master unit 10 transmits a WakeUP_frame 402 through the downlink 51 to activate the inactive uplink 52 (receiver 220*a* and transmitter 220*b*). The WakeUP_frame 402 is transmitted by a multicast or broadcast method. Therefore, as illustrated in FIGS. 21B and 21D, the WakeUP_frame 402 is further transferred from the IO unit 20-1 to the IO unit 20-2 after transferred from the master unit 10 to the IO unit 20-1.

At this point, the WakeUP_frame 402 is set to the "high priority". Therefore, even if the "low-priority" or "middle priority" frame is transmitted on the internal bus 5, the WakeUP_frame 402 is transmitted while overtaking the "low-priority" or "middle priority" frame, and the time necessary to complete the activation can be shortened.

As illustrated in FIGS. 21C and 21E, the IO unit 20 receiving the WakeUP_frame 402 activates the receiver 220*a* and transmitter 220*b* (DES section 222, forward controller 224 and SER section 226 in FIG. 4), and transmits a training signal 502 to the receiver 220*a* or transmitter 220*b* of the adjacent master unit 10 or IO unit 20 in order to make a notification of the existence of the own unit. Basically the training signal 502 is a noise signal having no meaning, and is used to inform of other units that the own unit is activated. That is, in response to the signal (WakeUP_frame 402) to activate the uplink 52, the IO unit 20 transmits a dummy signal onto the uplink 52 over a predetermined period.

Then, as illustrated in FIG. 21B, the master unit 10 transmits OUT_frame 404 through the downlink 51 when receiving the necessary data from the IO unit 20. The OUT_frame 404 includes the OUT data taken out from the upper-level communication frame. The IO unit 20 receiving the OUT_frame 404 updates the output value of the IO module 206 based on the OUT data included in the OUT_frame 404. The master unit 10 transmits a message 406 to the specific IO unit 20. In the case that the message 406 is directed toward the IO unit 20-1, the IO unit 20-1 does not transfer the message 406 to the next stage (see FIG. 21D).

Thus, the master unit 10 transmits the data to the IO unit 20 through the downlink 51 in succession to the command (WakeuUP_frame 402) to activate the uplink 52.

On the other hand, each IO unit 20 starts the data transfer to the master unit 10 when the transmission of the training signal is completed (a training period is ended). For example, when the transmission right is provided to the IO unit 20-1, the IO unit 20-1 transmits a message 504 to the master unit 10 as illustrated in FIG. 21B.

Then each IO unit 20 performs the IN data refresh. That is, each IO unit 20 acquires the latest state value input to the IO module 206, and transmits the IN_frame 506 including the latest state value to the master unit 10. The IN_frame 506 is sequentially transmitted from each IO unit 20 to the master unit 10.

The master unit 10 receiving the IN_frame 506 determines that the OUT data refresh and the IN data refresh are completed, and transmits a PowerDown_frame 408 through the downlink 51 to inactivate the active uplink 52 (receiver 220*a* and transmitter 220*b*). That is, when the data transmission through the uplink 52 from the IO unit 20 acting as the slave controller is completed, the master unit 10 acting as the master controller transmits the command (PowerDown_frame 408) to inactivate the uplink 52 to the IO unit 20 through the downlink 51. At this point, the PowerDown_frame 408 is set to the "high priority". Therefore, even if the "low-priority" or "middle priority" frame is transmitted on the internal bus 5, the PowerDown_frame 408 is transmitted while overtaking the "low-priority" or "middle priority" frame, and the time necessary to complete the activation can be shortened.

The inactive state of the uplink 52 is continued until the subsequent upper-level communication frame arrives.

As described above, in the application example, the master unit 10 transmits the command (PowerDown_frame 408) to inactivate the uplink 52 to the IO unit 20 through the downlink 51 when the data reception (IN data refresh) from the IO unit 20 through the uplink 52 is completed.

The IO unit 20 maintains the downlink 51 in the active state, and activates/inactivates the uplink 52 in response to the command (WakeUP_frame 402/PowerDown_frame 408) transmitted from the master unit 10 through the downlink 51.

In the application example, the power consumption can be reduced in the PLC system constructed by the master controller (master unit 10/CPU unit 40) and at least one IO unit 20, which are connected to each other through the internal bus 5 in the daisy chain manner.

J. Advantage

According to the embodiment, the priority-dependent data transmission can more efficiently be performed through the communication line. That is, even if the high-priority (latency is required to be further shortened) frame is transmitted in the configuration in which the devices are connected to one another in the daisy chain manner, the transmission rate of the high-priority frame is limited by the processing of transferring the preceding frame when the preceding frame is currently transferred. On the other hand, in the embodiment, the high-priority frame does not wait for the completion of the transmission of the preceding frame having the low priority, but the high-priority frame is transferred while overtaking the preceding frame. Therefore, the latency can be reduced.

The use of the data transmission processing of the embodiment can transmit the normal data and the system command in which immediacy is required through the identical communication line.

It is noted that the disclosed embodiment is not restrictive, but illustrative only. The scope of the present invention is indicated by not the above description but the claims. The meanings equivalent to the claims and all the changes within the scope of the present invention are also included in the present invention.

What is claimed is:

1. A control device constituting at least a part of a control system, the control device comprising a plurality of units connected to each other through a communication line,
   wherein each of the plurality of units comprises:
      a controller;
      a receiver configured to receive data from another unit through the communication line, the data being transmitted as a frame that is constructed by one or a plurality of blocks and comprises information indicating a priority of the data comprised in the frame;
      a transmitter configured to transmit the data as the frame to another unit through the communication line; and
      a generator configured to generate the data to be transmitted to another unit,
   wherein the transmitter transmits a second frame comprising the higher-priority data to be transmitted after being interrupted from transmitting an un-transmitted portion of a first frame comprising
      lower-priority data up to a predetermined block, when the higher-priority data to be transmitted is generated in the receiver or the controller while the transmitter transmits the first frame.

2. The control device according to claim 1, wherein the transmitter interrupts the transmission of the un-transmitted portion of the first frame until the transmission of the second frame.

3. The control device according to claim 1, wherein the transmitter discards the un-transmitted portion of the first frame.

4. The control device according to claim 1, wherein the transmitter transmits the second frame in advance of a third frame waiting to be transmitted, when the third frame exists at the generation of the data to be transmitted, and when the priority of the data comprised in the third frame is lower than the priority of the data to be transmitted.

5. The control device according to claim 4, wherein the transmitter transmits the second frame after transmitting the third frame waiting to be transmitted, when the third frame exists at the generation of the data to be transmitted, and when the priority of the data comprised in the third frame is equal to the priority of the data to be transmitted.

6. The control device according to claim 5, wherein each of the plurality of units comprises:
   a plurality of buffers; and
   a determination section configured to determine a buffer in which at least one of the data comprised in the frame received by the receiver and the data generated by the generator is stored based on the information indicating the priority of the data.

7. The control device according to claim 6, wherein the generator adds the information indicating the priority to the generated data according to a data type.

8. The control device according to claim 5, wherein the generator adds the information indicating the priority to the generated data according to a data type.

9. The control device according to claim 4, wherein each of the plurality of units comprises:
   a plurality of buffers; and
   a determination section configured to determine a buffer in which at least one of the data comprised in the frame received by the receiver and the data generated by the generator is stored based on the information indicating the priority of the data.

10. The control device according to claim 4, wherein the generator adds the information indicating the priority to the generated data according to a data type.

11. The control device according to claim 1, wherein the transmitter transmits the second frame after transmitting the third frame waiting to be transmitted, when the third frame exists at the generation of the data to be transmitted, and when the priority of the data comprised in the third frame is equal to the priority of the data to be transmitted.

12. The control device according to claim 1, wherein each of the plurality of units comprises:
   a plurality of buffers; and
   a determination section configured to determine a buffer in which at least one of the data comprised in the frame received by the receiver and the data generated by the generator is stored based on the information indicating the priority of the data.

13. The control device according to claim 1, wherein the generator adds the information indicating the priority to the generated data according to a data type.

14. A control method in a control system in which at least a part of the control system is constructed by a control device, the control device comprising a plurality of units connected to each other through a communication line,
   the control method comprising:
      receiving, by a first unit in the plurality of units, data from another unit in the plurality of units, through the communication line, the data being transmitted as a frame, each frame being constructed by one or a plurality of blocks and comprising information indicating a priority of the data comprised in the frame;
      transmitting, by the first unit in the plurality of units, the data as the frame to another unit in the plurality of units through the communication line;
      generating, by the first unit in the plurality of units, the data to be transmitted to another unit in the plurality of units; and
      transmitting, by the first unit in the plurality of units, a second frame comprising the higher-priority data to be transmitted after being interrupted from transmitting an un-transmitted portion of a first frame comprising
         lower-priority data up to a predetermined block, when the higher-priority data to be transmitted is generated while the first unit transmits the frame to another unit in the plurality of units.

* * * * *